United States Patent
Hyers

(10) Patent No.: US 10,234,749 B2
(45) Date of Patent: *Mar. 19, 2019

(54) SELF-CENTERING MECHANISM, A CLAMPING DEVICE FOR AN ELECTRONIC DEVICE AND MEANS FOR THEIR INTEGRATION

(71) Applicant: Carson Optical, Inc., Ronkonkoma, NY (US)

(72) Inventor: Michelle Hyers, Hicksville, NY (US)

(73) Assignee: Carson Optical, Inc., Ronkonkoma, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,337

(22) Filed: Sep. 8, 2016

(65) Prior Publication Data

US 2016/0377961 A1   Dec. 29, 2016

Related U.S. Application Data

(63) Continuation of application No. 14/107,796, filed on Dec. 16, 2013, now Pat. No. 9,442,349.

(51) Int. Cl.
*G03B 17/48* (2006.01)
*G03B 17/56* (2006.01)
(Continued)

(52) U.S. Cl.
CPC ............ *G03B 17/566* (2013.01); *B23Q 1/76* (2013.01); *B23Q 7/043* (2013.01); *B25B 5/06* (2013.01);
(Continued)

(58) Field of Classification Search
CPC ............ B60R 2011/0071; G03B 17/48; G03B 17/566; G03B 29/00; H04N 5/2251;
(Continued)

(56) References Cited

U.S. PATENT DOCUMENTS 391,533 A * 10/1888 Howard .................. B25D 5/02
144/253.7
1,370,705 A    3/1921 Samuel
(Continued)

FOREIGN PATENT DOCUMENTS

CN         101855041 A     10/2010
DE            0225984       6/1987
(Continued)

OTHER PUBLICATIONS

Snapzoom adapter (snapzooms.com) Appendix I (Publicly available as of Dec. 15, 2013).
(Continued)

*Primary Examiner* — Eret C McNichols
(74) *Attorney, Agent, or Firm* — Carmody Torrance Sandak & Hennessey LLP

(57) ABSTRACT

This invention comprises a self-centering mechanism for retaining an object, a clamping device for retaining an electronic device or an electronic device in a case, and means to integrate the devices in an adapter form. The structure of the self-centering mechanism allows for a compact device that is capable of fitting a wide range of differently sized and shaped objects. The clamping device allows for means to retain an electronic device or an electronic device in a case that is capable of fitting a wide range of differently sized and shaped electronic device. The self-centering mechanism and clamping device can also be integrated into the form of an adapter for various applications.

23 Claims, 39 Drawing Sheets

(51) Int. Cl.
| | |
|---|---|
| F16B 2/10 | (2006.01) |
| F16B 2/12 | (2006.01) |
| G03B 29/00 | (2006.01) |
| H04N 5/225 | (2006.01) |
| F16M 11/04 | (2006.01) |
| F16L 1/20 | (2006.01) |
| F16L 3/10 | (2006.01) |
| B25J 15/10 | (2006.01) |
| B25B 5/06 | (2006.01) |
| B23Q 1/76 | (2006.01) |
| B60R 11/02 | (2006.01) |
| B23Q 7/04 | (2006.01) |
| F16B 2/18 | (2006.01) |
| G02B 7/00 | (2006.01) |
| F16M 13/00 | (2006.01) |
| F16M 13/02 | (2006.01) |
| B60R 11/00 | (2006.01) |

(52) U.S. Cl.
CPC ............ *B25B 5/061* (2013.01); *B25B 5/064* (2013.01); *B25J 15/10* (2013.01); *B60R 11/02* (2013.01); *B60R 11/0252* (2013.01); *F16B 2/10* (2013.01); *F16B 2/12* (2013.01); *F16B 2/185* (2013.01); *F16L 1/207* (2013.01); *F16L 3/1066* (2013.01); *F16M 11/041* (2013.01); *F16M 13/00* (2013.01); *F16M 13/02* (2013.01); *G02B 7/003* (2013.01); *G03B 17/48* (2013.01); *G03B 29/00* (2013.01); *H04N 5/2251* (2013.01); *H04N 5/2253* (2013.01); *H04N 5/2254* (2013.01); *H04N 5/2257* (2013.01); *B60R 2011/0071* (2013.01); *B60R 2011/0085* (2013.01); *Y10T 24/44282* (2015.01); *Y10T 24/44299* (2015.01); *Y10T 24/44325* (2015.01); *Y10T 24/44333* (2015.01); *Y10T 24/44376* (2015.01); *Y10T 29/49863* (2015.01)

(58) Field of Classification Search
CPC .. H04N 5/2254; H04N 5/2253; H04N 5/2257; F16M 11/041; F16L 1/207; F16L 3/1066
See application file for complete search history.

(56) References Cited

U.S. PATENT DOCUMENTS

| | | | |
|---|---|---|---|
| 2,612,809 A | 10/1952 | Shager | |
| 3,636,294 A | 1/1972 | Peyrot | |
| 3,841,647 A | 10/1974 | Cooper | |
| 3,899,162 A | 8/1975 | Fischer | |
| 4,366,606 A | 1/1983 | Willis | |
| 4,465,422 A | 8/1984 | Blust et al. | |
| 4,810,019 A | 3/1989 | Brucher | |
| 4,938,489 A | 7/1990 | Nemirovsky | |
| 4,967,579 A * | 11/1990 | Haydo | B21B 25/02 72/428 |
| 5,168,168 A | 12/1992 | Luecke | |
| 5,201,501 A | 4/1993 | Fassler | |
| 5,347,897 A | 9/1994 | Rouleau | |
| 5,480,115 A * | 1/1996 | Haltof | H01H 9/025 248/221.11 |
| 6,002,921 A | 12/1999 | Pfahlert et al. | |
| 6,357,322 B1 | 3/2002 | Dolan et al. | |
| 6,458,022 B1 | 10/2002 | Folz | |
| 7,080,812 B2 | 7/2006 | Wadsworth et al. | |
| 7,273,199 B2 | 9/2007 | Piekarz | |
| 7,293,812 B2 | 11/2007 | Kushnir | |
| 7,509,722 B2 | 3/2009 | Shahin | |
| 7,712,719 B2 * | 5/2010 | Derry | F16M 11/10 248/346.06 |
| 7,918,427 B2 | 4/2011 | Wang | |
| 7,971,917 B2 | 7/2011 | Ge | |
| 8,136,780 B2 | 3/2012 | Lin | |
| 8,286,955 B2 | 10/2012 | Damang | |
| 8,544,161 B2 | 10/2013 | Carnevali | |
| 8,544,914 B2 | 10/2013 | Hessels et al. | |
| 8,550,413 B2 | 10/2013 | Warrick | |
| 8,638,557 B2 | 1/2014 | Tsai | |
| 8,947,589 B1 | 2/2015 | Okabe et al. | |
| 9,062,820 B2 | 6/2015 | Allmendinger et al. | |
| 9,066,421 B1 | 6/2015 | Martin | |
| 9,071,675 B2 | 6/2015 | Willenborg | |
| 9,080,714 B2 | 7/2015 | Minn et al. | |
| 9,623,526 B2 * | 4/2017 | Perez | B23Q 1/76 |
| 2004/0007651 A1 * | 1/2004 | Williams | F16M 11/041 248/346.06 |
| 2006/0255229 A1 * | 11/2006 | Cheng | A47B 23/043 248/458 |
| 2006/0278788 A1 * | 12/2006 | Fan | B60R 11/02 248/309.1 |
| 2006/0290654 A1 * | 12/2006 | Wang | B60R 11/0235 345/156 |
| 2007/0284500 A1 | 12/2007 | Fan | |
| 2008/0139092 A1 | 6/2008 | Lessway | |
| 2008/0289463 A1 | 11/2008 | Rehm | |
| 2008/0296821 A1 | 12/2008 | Carnevali | |
| 2009/0060473 A1 | 3/2009 | Kohte et al. | |
| 2010/0187740 A1 | 7/2010 | Orgeron | |
| 2010/0252976 A1 | 10/2010 | Damang | |
| 2012/0104195 A1 | 5/2012 | Da Costa Pito et al. | |
| 2012/0256068 A1 * | 10/2012 | Su | F16M 11/041 248/288.11 |
| 2012/0261520 A1 * | 10/2012 | Groomes | B64C 13/04 244/234 |
| 2012/0318937 A1 | 12/2012 | Carnevali | |
| 2013/0037590 A1 | 2/2013 | Yoon | |
| 2013/0140839 A1 | 6/2013 | Quinn et al. | |
| 2013/0148273 A1 | 6/2013 | Tsai | |
| 2013/0170823 A1 | 7/2013 | McDonald et al. | |
| 2013/0175413 A1 | 7/2013 | Waugh | |
| 2013/0230309 A1 | 9/2013 | Designport | |
| 2013/0293840 A1 | 11/2013 | Bartels | |
| 2013/0331148 A1 | 12/2013 | Brough | |
| 2014/0072362 A1 | 3/2014 | Hyers | |
| 2014/0097306 A1 | 4/2014 | Hale et al. | |
| 2014/0134874 A1 | 5/2014 | Palmer et al. | |
| 2014/0192482 A1 | 7/2014 | Lin | |
| 2014/0253800 A1 * | 9/2014 | Mcleod | F16M 11/041 348/376 |
| 2014/0260809 A1 | 9/2014 | Miller et al. | |
| 2014/0263931 A1 | 9/2014 | Chen | |
| 2014/0305981 A1 | 10/2014 | Bijlholt | |
| 2014/0317987 A1 | 10/2014 | Kuehl et al. | |
| 2014/0362283 A1 | 12/2014 | Coppage et al. | |
| 2015/0042873 A1 | 2/2015 | Hunt | |
| 2015/0122092 A1 * | 5/2015 | Tsai | B23Q 1/76 82/170 |
| 2015/0156378 A1 | 6/2015 | Wood et al. | |
| 2015/0201113 A1 | 7/2015 | Wood | |
| 2015/0285432 A1 * | 10/2015 | Johnson | F16M 13/022 248/476 |
| 2015/0338982 A1 * | 11/2015 | Dufva | G06F 3/023 345/168 |

FOREIGN PATENT DOCUMENTS

| | | |
|---|---|---|
| DE | 3717091 | 8/1988 |
| DE | 4209241 | 9/1993 |
| DE | 9218546 | 7/1994 |
| DE | 10315006 | 8/2004 |
| DE | 202014101965 | 7/2014 |
| EP | 0899056 | 3/1999 |
| EP | 2583786 | 4/2013 |
| JP | 11985039496 | 3/1985 |
| JP | 1992310390 | 2/1992 |
| SU | 1177151 | 9/1985 |

(56) References Cited

FOREIGN PATENT DOCUMENTS

WO 2013183812 A1 12/2013
WO WO 2014020050 2/2014

OTHER PUBLICATIONS

Phone Rope www.PhoneSkope.Com Appendix II (Publicly available as of Dec. 15, 2013.
iScope www.iscope.com Dec. 16, 2013 Appendix III (Publicly available as of Dec. 15, 2013).

* cited by examiner

SELF-CENTERING MECHANISM, A CLAMPING DEVICE FOR AN ELECTRONIC DEVICE AND MEANS FOR THEIR INTEGRATION

BACKGROUND OF THE INVENTION

The present invention relates generally to a self-centering mechanism, a clamping device to retain an electronic device, and means for their integration in the form of an adapter. In particular, the present invention is directed to a self-centering mechanism and a clamping device to retain an electronic device, which each by its construction and assembly provides for significant advantages over other approaches currently available. Furthermore, the present invention is also directed to the means to integrate a self-centering mechanism with a clamping device to retain an electronic device, whereby the overall device is an adapter.

Self-centering of circular, cylindrical, square or any object with at least one symmetrical cross-section is a useful feature when aligning any object to a device with an alignment axis. Self-centering mechanisms are advantageous in numerous applications, such as but not limited to, optics mounts, tool holders, work holders, adapters, or the like. Self-centering mechanisms are constructed with a functional range of diameters or sizes, such that objects within that range are self-centered related to the alignment axis, while objects outside the range are not guaranteed to be aligned. Almost all approaches for self-centering utilize a large structure, such that the outer dimensions of the mechanism are much larger than the maximum sized self-centered object. One common type of mechanism utilizes various means and geometries to extend multiple arms or holders from a large external ring portion towards the object (U.S. Pat. No. 3,841,647). These larger mechanisms can be biased to also act as a clamp or have a locking portion, whereby one or more arms or extenders must be pushed outwards and then released. More common approaches use two opposing V-shaped holders that move against each other in a linear track, which requires the device to be very large to allow for the linear travel needed for the V-shaped holders so that they can fit a range of differently sized objects (U.S. Pat. No. 8,550,413). There are also self-centering mechanisms that try to allow for a more compact design but either utilize very complex geometries that are difficult to scale or add additional contact points (U.S. Pat. No. 5,168,168), require a large number of linkages (U.S. Pat. No. 4,938,489) to achieve self-centering motion of the mechanism or are for only a specific object or extremely narrow size range of objects. Furthermore, most of the self-centering mechanisms lack an easy and intuitive means to actuate the self-centering clamp, especially with a low hand force required compared to the amount of clamping force applied.

Notwithstanding all the known methodologies and construction for a self-centering mechanism however, it is believed that still further advancements in the art are achievable. In particular, it is desirable to construct a self-centering device that is both compact, scalable to meet requirements and contact points required, easily actuated by the user and with minimal parts. Accordingly, it is desirable to provide a construction and methodology of a self-centering mechanism, that overcomes the foregoing deficiencies in the prior art as well as achieves the aforementioned and below mentioned objects and advantages.

Regarding a clamping device for an electronic device, there are numerous prior art examples of devices and methods to retain an electronic device. Yet, many clamping devices for electronic devices are specific to the device, and cannot account for various differences in the electronic device, such as when the electronic device is within a case of various geometries. There are several approaches that retain an electronic device over a range of sizes, but each method has deficiencies in ease of use, compact size, repeated usage and integration with other devices for mounting or alignment applications. The most common is a two-sided linear style clamp, typically with a rack and pinion mechanism or a captive nut with threaded rods. In the case of the rack and pinion style mechanism, the user must hold their phone in the area between the two clamps and then push the mechanism from both sides until tight around their phone. As this is a discrete adjustment method, depending on the outer dimensions of the electronic device, the electronic device may be over-tight in the clamp or somewhat loose. Upon removal from such a device, the user once again has to pull the mechanism from one or more sides outwards to release their phone. This method is awkward for the user, typically requires two hands and can inconsistently clamp the electronic devices within the specified size range. The captive nut with threaded rod approach is a continuous adjustment, however requires the device to be quite large for the travel required of the linear track within where the two clamping portions move and the user to make a manual adjustment each time the device is loading and unloaded. A second approach involves a tacky or sticky member wherein the electronic device is held due to adhesion. The tacky or sticky member can be made from a selection of materials; however, the adhesion properties of these materials have a limited lifetime, or must be refreshed with water or another material. The adhesive nature also makes the device attract dust and dirt, and requires a lot of user maintenance. The third approach is utilizing an X-shaped grip to hold the electronic device (U.S. Pat. No. 8,544,161). The X-shaped clamp remedies some of the previous prior art deficiencies, however, such a device still has several disadvantages. In terms of the use, such an approach could be difficult for the user to clamp their phone as it requires pulling apart two biased opposing arms. Also, it's centralized and thick mechanism does not allow for easy integration with some other devices, for example, but not limited to, a large optical element connected to the camera of the electronic device. Furthermore, this approach does not lend itself to an easy or integrated means of alignment. For example, if the device needed to be aligned to another device or mechanism, this device would have to include additional mechanisms to make an adjustment to the alignment in at least two directions, thereby making the final device overcomplicated and bulky.

Therefore, it is desirable to construct a clamping device for an electronic device or an electronic device within a case, for a large range of sizes, which is compact in size, easily actuated by the user, designed for repeated usage, and allows for integration with other devices for mounting or alignment applications. Accordingly, it is desirable to provide a construction and methodology of a novel clamping device for an electronic device, that overcomes the foregoing deficiencies in the prior art as well as achieves the aforementioned and below mentioned objects and advantages.

The aforementioned self-centering mechanism and clamping device for an electronic device can also be integrated into a single adapter device. Limited prior art examples exist for such a self-centering adapter device for an electronic device. A few prior art references utilize self-centering mechanisms, such as a collet-style adapter or a common radially biased three arm mechanism, which can retain and self-center a range of differently sized objects but can only do so over an extended range, nor provides means to combine with a range of differently sized electronic devices. The second prior art example demonstrates an adapter device, but each individual portion utilizes existing prior art means with the aforementioned deficiencies. Namely, the self-centering mechanism uses two V-shaped clamps, and the clamping device for the electronic device uses a two-sided linear clamp with a captive nut and threaded rods. The obvious combination of known devices provides for an adapter, but does not overcome any of the known disadvantages with each individual device. The second prior art reference also does not include any bias means, such that all clamping must be done manually and are time-consuming as a result. No prior art exists for a compact and portable optical adapter which integrates a novel self-centering mechanism and clamping device for an electronic device.

Accordingly, it is desirable to provide a construction and methodology of a self-centering adapter for an electronic device, and an optical adapter in particular, that overcomes the foregoing perceived deficiencies as well as achieves the aforementioned and below mentioned objects and advantages.

OBJECTS AND SUMMARY OF THE INVENTION

Accordingly, it is an object of the present invention to provide an improved self-centering mechanism for an object.

It is a particular object of the present invention to provide an improved self-centering mechanism which is biased so as to releasably engage with a range of differently sized and shaped objects.

It is yet another object of the present invention to provide a clamping device for retaining an electronic device.

It is still another object of the present invention to provide an improved clamping device for retaining a wide range of differently sized and shaped electronic devices.

Yet a further object of the present invention is to provide an improved self-centering mechanism and a clamping device for electronic device which are more intuitive and easy to use compared to prior art.

Still another object of the present invention is to provide integration of the aforementioned self-centering mechanism and clamping device in the form of an adapter.

It is yet another object of the present invention to provide an improved method of a self-centering mechanism, and a clamping device for retaining an electronic device.

Further objects and advantages of this invention will become more apparent from a consideration of the drawings and ensuing description.

The invention accordingly comprises the features of construction, combination of elements and arrangement of parts and sequence of steps which will be exemplified in the construction, illustration and description hereinafter set forth, and the scope of the invention will be indicated in the claims.

In a preferred embodiment, a self-centering mechanism to retain an object is presented, wherein the self-centering mechanism comprises: a main body having an alignment axis and at least two pivot axes, a first arm rotatable about the first pivot axis, and having at least one tangential member and at least one end, a second arm rotatable about the second pivot axis, and having at least one tangential member and at least one end, a first tangential member, such that the first tangential member moves in a tangential manner with the tangential member of the first arm, a second tangential member, such that the second tangential member moves in a tangential manner with the tangential member of the second arm, and a third arm having at least one end, said third arm being coupled to or integral with said first tangential member, wherein the geometry of the tangential members of the first and second arm and first and second tangential members, are such that the ends of at least the first, second and third arm move in a self-centering manner.

Additionally presented is a clamping device for individually retaining at least one of an electronic device and an electronic device in a case, having at least a first, second and third side, wherein the clamping device comprises: a main body having a first surface, a first axis and a pivot axis, a first holder member being rotatable about the pivot axis and having a first end, a bias member preferentially rotating the first end of the first holder towards the first axis, a second holder member having a first surface, such that when the electronic device is held in the retained state, the third side is in at least partial contact with the first surface of the main body, the first end of the first holder portion is in at least partial contact with the first side of the electronic device, the first surface of the second holder portion is in at least partial contact with the second side of the electronic device, and the electronic device is retained due to the clamping force of the bias member that occurs between the first end of the first holder and the first surface of the second holder portion.

In a particular embodiment, a self-centering adapter for retaining an optical device or object to an electronic device or an electronic device in a case having at least a first, second and third side and an optical axis, wherein the self-centering adapter comprises: a main body having an alignment axis, at least three pivot axes, and a first surface, a first arm rotatable about the first pivot axis, and having at least one tangential member and at least one end, a second arm rotatable about the second pivot axis, and having at least one tangential member and at least one end, a first tangential member, such that the first tangential member moves in a tangential manner with the tangential member of the first arm, a second tangential member, such that the second tangential member moves in a tangential manner with the tangential member of the second arm, a third arm having at least one end, said third arm being mechanically connected to or a part of said first tangential member, a first holder member being rotatable about the third pivot axis and having a first end, a bias member preferentially rotating the first end of the first holder towards the alignment axis, a second holder member having a first surface, such that when the electronic device is held in the retained state, the third surface is in at least partial contact with the first surface of the main body, the first end of the first holder portion is in contact with the first side of the electronic device, the first surface of the second holder portion is in contact with the second side of the electronic device, and the electronic device is retained due to the clamping force of the bias member that occurs between the first end of the first holder and the first surface of the second holder portion, wherein the geometry of the tangential members of the first and second arm, and first and second tangential members, are selected such that the ends of at least the first, second and third arm releasably engage with an optical device in a self-centering manner, such that when the electronic device is held in the retained and aligned state so that the optical axis of the electronic device is aligned to the alignment axis of the main body, the electronic device can releasably engage with an optical device or object in a self-centering manner relative to the optical axis of the electronic device.

A self-centering method to retain an object is presented, wherein the self-centering mechanism comprises: a main body having an alignment axis and at least two pivot axes, a first arm rotatable about the first pivot axis, and having at least one surface and at least one end, a second arm rotatable about the second pivot axis, and having at least one surface and at least one end, a first tangential member, having at least one surface, said surface of the first tangential member being in tangential contact with the said surface of the first member, a second tangential member, having at least one surface, said surface of the second tangential member being in tangential contact with the said surface of the second member, a third arm having at least one end, said third arm being mechanically connected to or a part of said first tangential member, and at least one bias member, and wherein the bias member preferentially rotates at least one end of a member towards the central axis, wherein the shapes of the surfaces of the first and second arm, and first and second tangential members, are selected such that the ends of at least the first, second and third arm releasably engage with an object in a self-centering manner, wherein the method compromises the steps of: pressing the first and second arms in conjunction, such that pressing both arms, causes the ends of at least the first, second and third arms to move away from the alignment axis in a self-centering manner, inserting the object into the self-centering mechanism, releasing both the first and second arms, such that the ends of at least the first, second and third arms to move towards the alignment axis in a self-centering manner, and then releasably engage with the object in a self-centering manner.

Lastly, a clamping method for retaining an electronic device or an electronic device in a case is presented, wherein the method utilizes a clamping device for individually retaining at least one of an electronic device and an electronic device in a case having at least a first, second and third side, wherein the clamping device comprises: a main body having a first surface, a first axis and a pivot axis, a first holder member being rotatable about the pivot axis and having a first end, a bias member preferentially rotating the first end of the first holder towards the first axis, a second holder member having a first surface, such that when the electronic device is held in the retained state, the third surface is in at least partial contact with the first surface of the main body, the first end of the holder portion is in contact with the first side of the electronic device, the first surface of the second holder portion is in contact with the second side of the electronic device, and the electronic device is retained due to the clamping force of the bias member that occurs between the first end of the first holder and the first surface of the second holder portion, wherein the method compromises the steps of retracting the first holder portion away from the first axis of the main body, placing the third surface of the electronic device in at least partial contact with the first surface of the main body, and releasing the first holder portion such that it can move towards the first axis of the main body.

BRIEF DESCRIPTION OF THE DRAWINGS

Like reference numerals in the various Figures illustrate like parts, but not every part in every figure is so identified.

DETAILED DESCRIPTION OF THE PREFERRED EMBODIMENT

As set forth in the Background Section above, and as will be appreciated below, the present invention is primarily directed to a self-centering mechanism, a clamping device retaining an electronic device and means of their integration through the form of an adapter device. It will be made clear from the below description of the construction of each device, that each device is unique and not obvious in view of existing prior art.

Figure 1A:
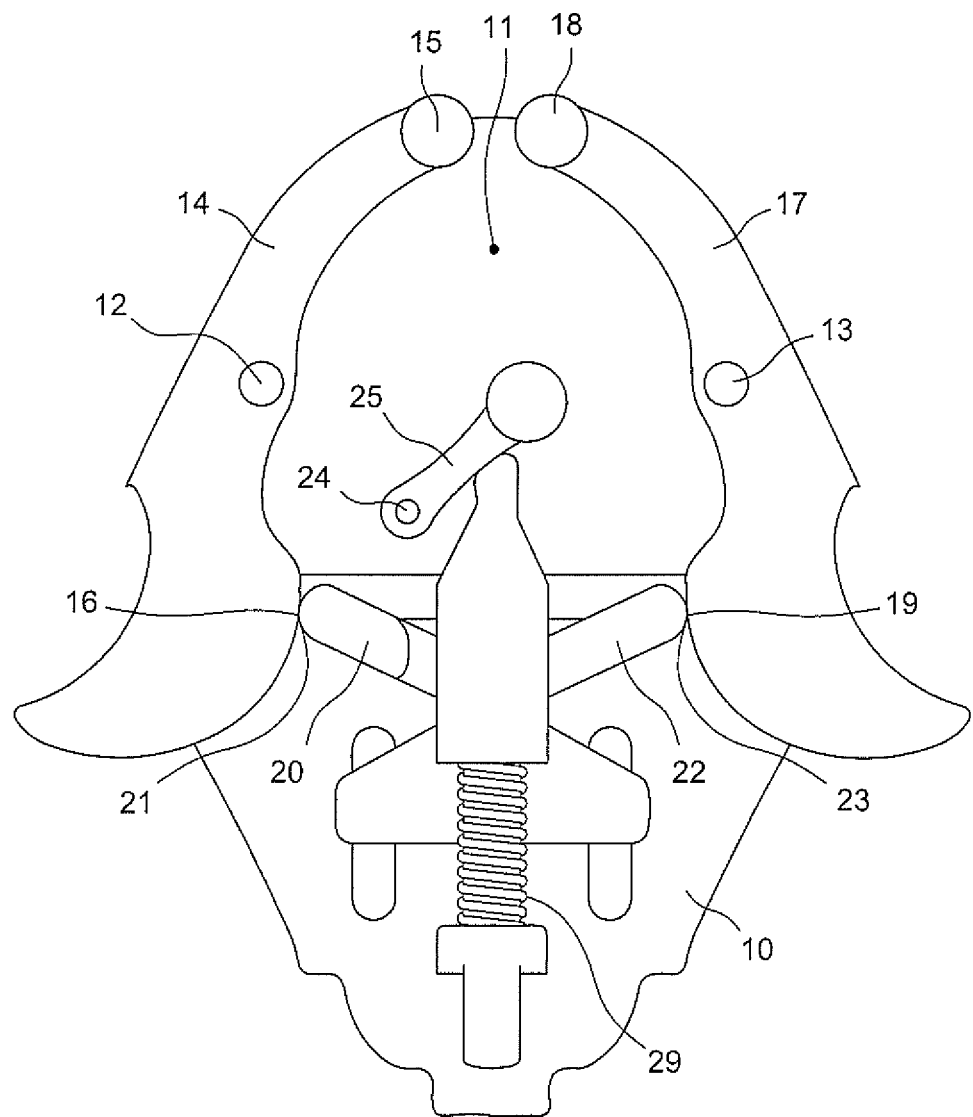
FIG. 1A is a top plan view of a first preferred embodiment of the self-centering mechanism of the self-centering mechanism constructed in accordance with the present invention.

The first preferred embodiment of the self-centering mechanism depicted in FIG. 1A, depicts the first arm (14) and second arm (17) rotatably coupled to the main body at their respective pivot axes (12, 13). The third arm (25) also is rotatably coupled to the main body at a third pivot axis (24). The first and second tangential members (20, 22) move tangentially with the tangential member of the first arm (16) and the tangential member of the second arm (19). In this embodiment of the self-centering mechanism, the tangential movement is accomplished via tangential contact between the respective sets of surfaces (16 and 21, 19 and 23). The third arm is coupled to the first and second tangential member by an intermediate member. In this first embodiment of the self-centering mechanism, the intermediate member couples to the third arm by another tangential contact between surfaces. However, this coupling could also be achieved by various methods, such as but not limited to: mechanical connectors, fasteners, pins, or additional intermediate parts.

The first embodiment of the self-centering mechanism demonstrates one example of the geometry of each tangential member that was designed such that the ends of the first, second and third arm move in a self-centering manner about the alignment axis 11 (shown out of the plane in FIG. 1-7). In this embodiment of the self-centering mechanism, wherein the tangential members are surfaces, the specific arcs and spline geometry can be specifically designated to achieve the self-centering result. However, for such a tangential contact method, strict attention must be paid to the steepness and derivative properties of the curves, such that the two surfaces slide smoothly and consistently so as to achieve ideal functionality. Depending on the required constraints of the construction, such as physical size and maximum self-centered object size, the geometry can be tailored to fit a range of differently sized and shaped objects. However, there is an ideal surface shape and function that maximizes the range of sizes of objects that can be self-centering, while also minimizing the physical size of the mechanism, given a known maximum self-centered object size. Also, the distances between the end of the first arm and second arm to their respective pivot axes, and the position of the pivot axes relative to the alignment axis are based upon the maximum sized object that can be releasably engaged in a self-centering manner by the self-centering mechanism. Also, the self-centering mechanism can utilize at least one plane of symmetry that includes the alignment axis. Therefore, once a maximum object size requirement is set, the geometry and construction of the self-centering mechanism can be determined and optimized to the ideal case of maximizing the size range of objects.

Figure 1B:
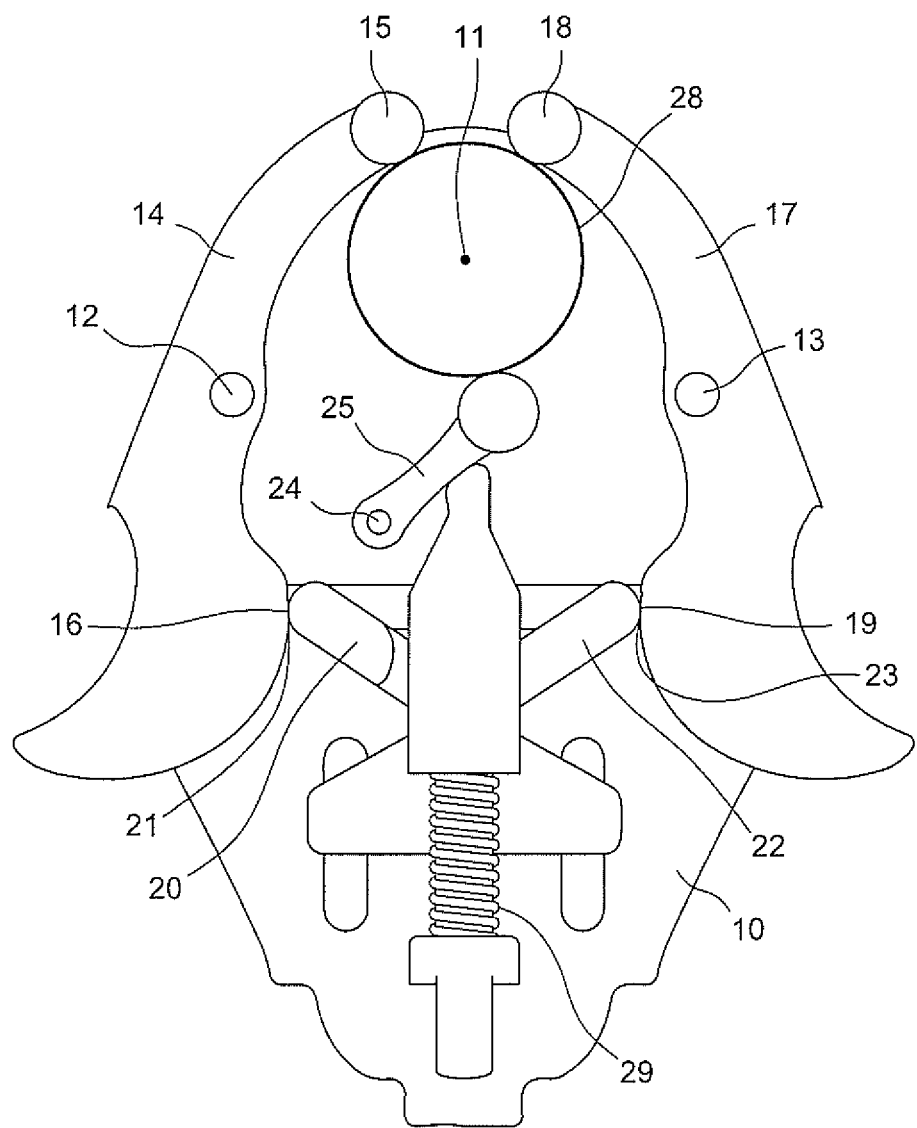
FIG. 1B is a top plan view of a first preferred embodiment of the self-centering mechanism constructed in accordance with the present invention releasably engaged with a smaller circular object in a self-centering manner.
Figure 1C:
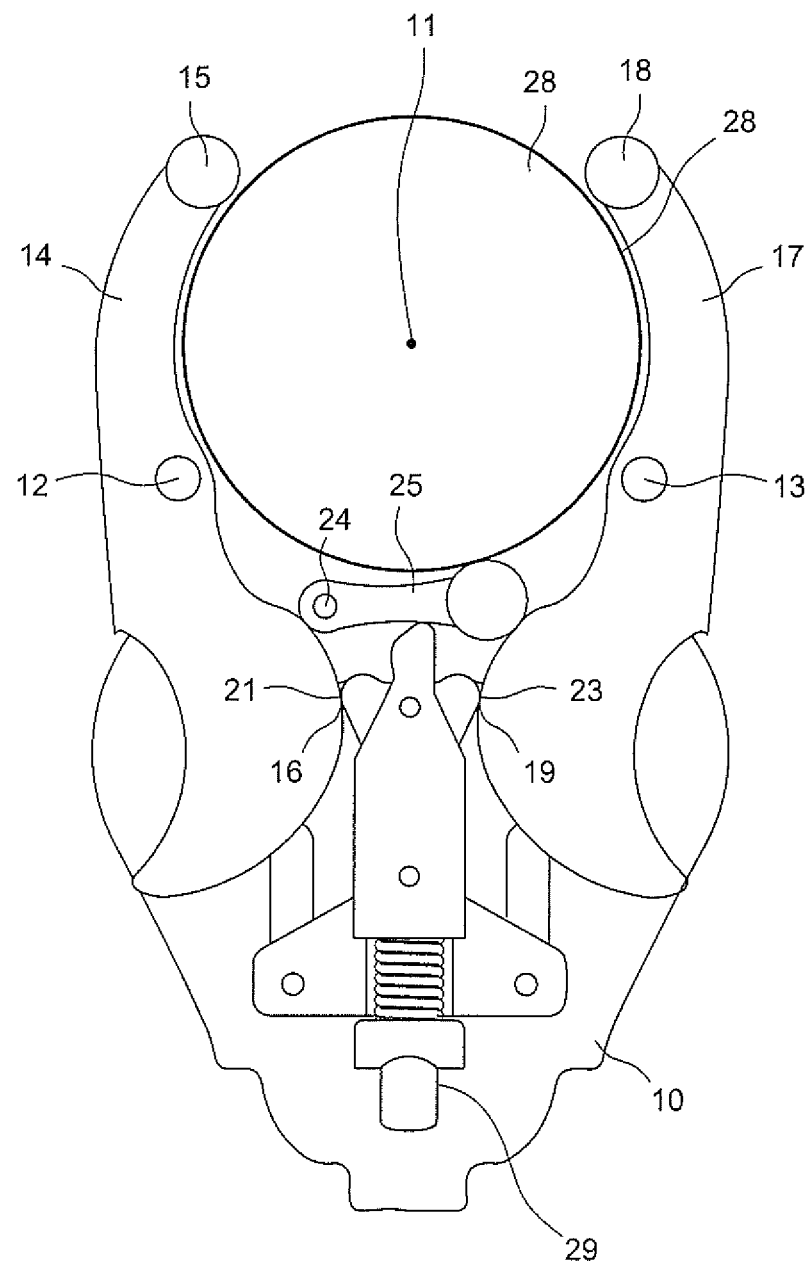
FIG. 1C is a top plan view of a first preferred embodiment of the self-centering mechanism constructed in accordance with the present invention releasably engaged with a larger circular object in a self-centering manner.

FIGS. 1B-1C show the first preferred embodiment of the self-centering mechanism releasably engaged with a smaller cylindrical or circular object and a larger cylindrical or circular object respectively. Depending on the placement of the pivot axes, 12, 13, and 24 on the main body 10, the range of objects can be adjusted to the desired specifications, namely a maximum self-centered object size. The correlation between the maximum sized object that is self-centered on the main body 10 relative to the pivot axes can be clearly viewed in FIG. 1C.

The first preferred embodiment of the self-centering mechanism also demonstrates the novel construction of the self-centering adapter, which inherently is designed for easy user actuation. By simple extension of the first and second arms, the user can apply pressure placed onto opposing sections of the first and second arm 14, 17. There can also be cut-out shapes, contours or elastomeric coatings or members placed on the arms to allow for more ergonomic and intuitive use. The pressing of opposing arms is a natural gripping motion, and is convenient for the user. Furthermore, due to the bias member 29 that preferentially rotates the ends of the arms towards the alignment axis, upon user release of the arms; the object is releasably retained in a self-centering manner. In this example, the single compression spring supplies a linear force which is translated to the ends of the first, second and third arms, which provides a strong clamping force that retains the object. The self-centering mechanism is easily actuated by user and allows for the quickest on-off compared to any prior art. There are no screws to adjust until tighten and then loosen, or several levers to pull then lock, then unlock etc. The user simply pushes the two arms together, places over the object, then releases. In typical use, this process can take merely a second or two. It can be highly repeatable in accuracy in the placement and usage of the presented self-centering mechanism. Also, a long lever arm can be used, such that the user presses the arms together allows for significant leverage. This means that even with a very strong bias member with a large bias force, the user does not need to provide equal or near equal force to actuate the device, but instead a small fraction of the force. Prior art examples with bias members do not always allow for low human force with a large force bias member, and typically are very hard to open and actuate by the user, which makes usage more frustrating and time-consuming.

Figure 2A:
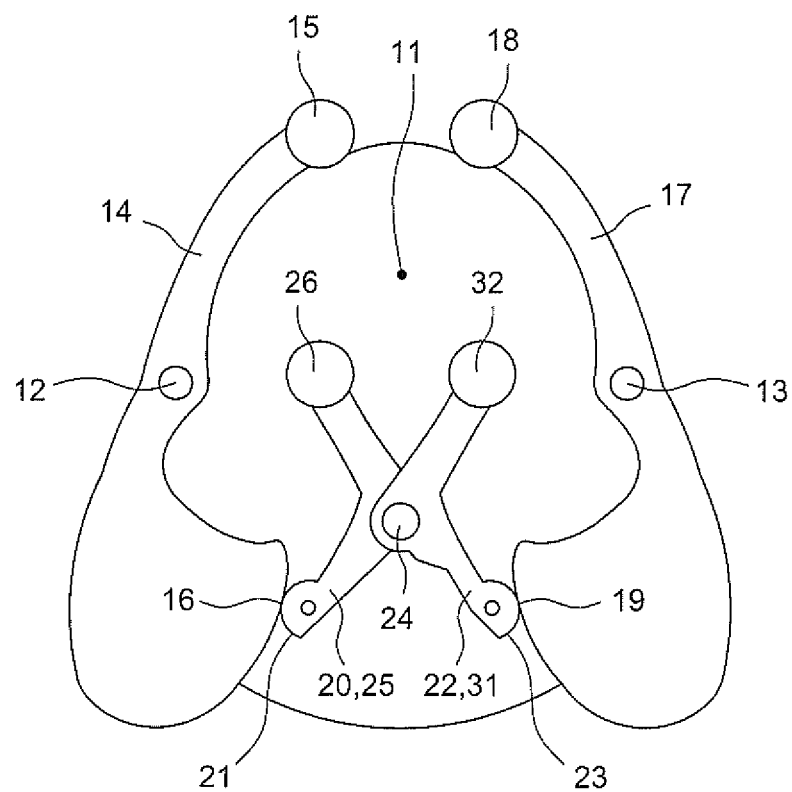
FIG. 2A is a top plan view of a second preferred embodiment of the self-centering mechanism constructed in accordance with the present invention.

The second preferred embodiment of the self-centering mechanism FIG. 2A eliminates parts from the first preferred embodiment of the self-centering mechanism, namely, the intermediate members coupling the third arm to the tangential members, and the additional tangential member parts—in this case, the first and second tangential members 20, 22 are a part of the third arm 25 and fourth arms 31. The third and fourth arms are pivotally coupled at pivot axis 24, and can be biased by an additional member, such as but not limited to, one or more torsional springs. Furthermore, the motion of the third and fourth arms can be further coupled to guarantee equal motion, such that the ends of the arms move in a self-centering manner, such as but not limited to, linear tracks, gears, mechanical connectors, pins, or intermediate members. The second preferred embodiment of the self-centering mechanism also demonstrates a fourth end, which helps to further secure the object, whereas all prior art typically is limited to only three ends due to the inherent construction. Yet it should be noted that this approach is easily scalable in regards to the number of ends, and maximum self-centered object size, based upon the desired requirements of the device.

Figure 2B:
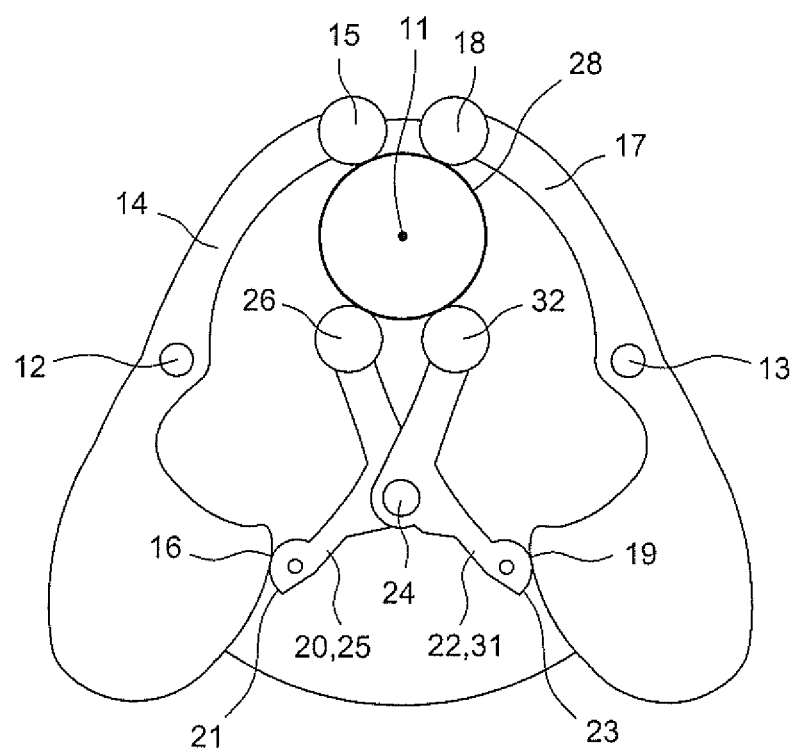
FIG. 2B is a top plan view of a second preferred embodiment of the self-centering mechanism constructed in accordance with the present invention releasably engaged with a smaller circular object in a self-centering manner.
Figure 2C:
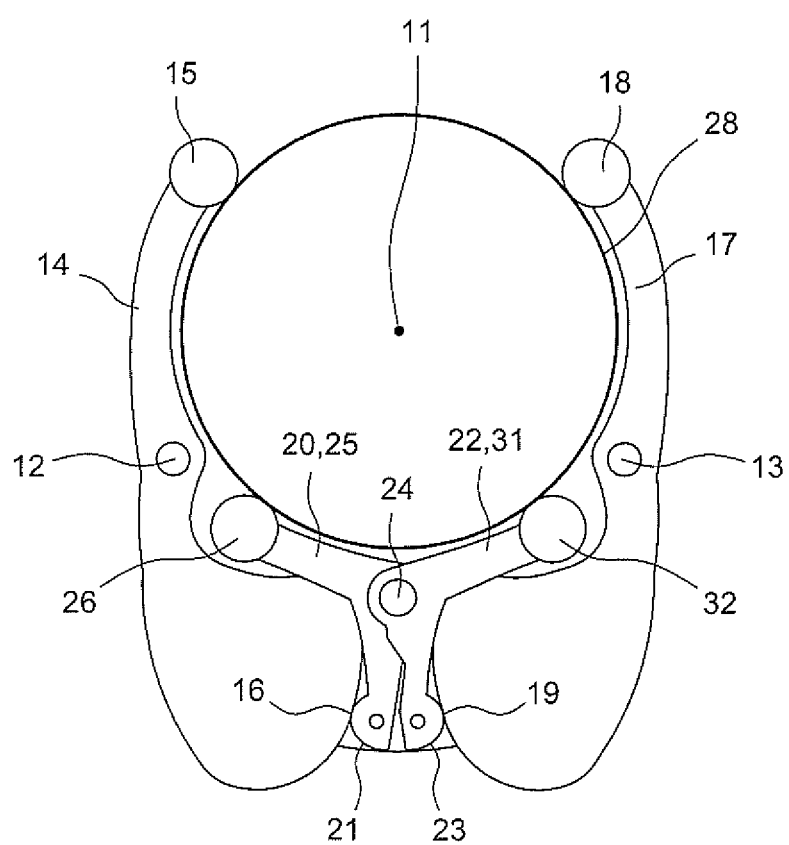
FIG. 2C is a top plan view of a second preferred embodiment of the self-centering mechanism constructed in accordance with the present invention releasably engaged with a larger circular object in a self-centering manner.

FIG. 2B and FIG. 2C demonstrates that the compact size of the device, especially in the radial direction, where it can become more compact when retaining a small object, yet expand to fit the largest object. In this specific embodiment, the characteristic size range is 20 mm-58 mm. In this case, the characteristic size can correspond to a diameter, length, diagonal or any characteristic size feature of cross-section of the object. Also, the device has non-radially symmetric functional shape, which allows for the actuation to be readily accessible to the user, and has more of a generally rectangular form which is ideal to mate the mechanism with other devices. However, the orientation of the self-centering device is arbitrary, given that the self-centering mechanism can function in any orientation. Even though only one possible orientation in shown in the figures presented, the mechanism can be rotated by any amount, for example, 45, 90, 180, 270 degrees or any combination thereof, and achieve the same results. Furthermore, depending on the application and the room available, the device may be easily rotated to present the actuation area of the first and second arms more readily to the user.

Figure 3A:
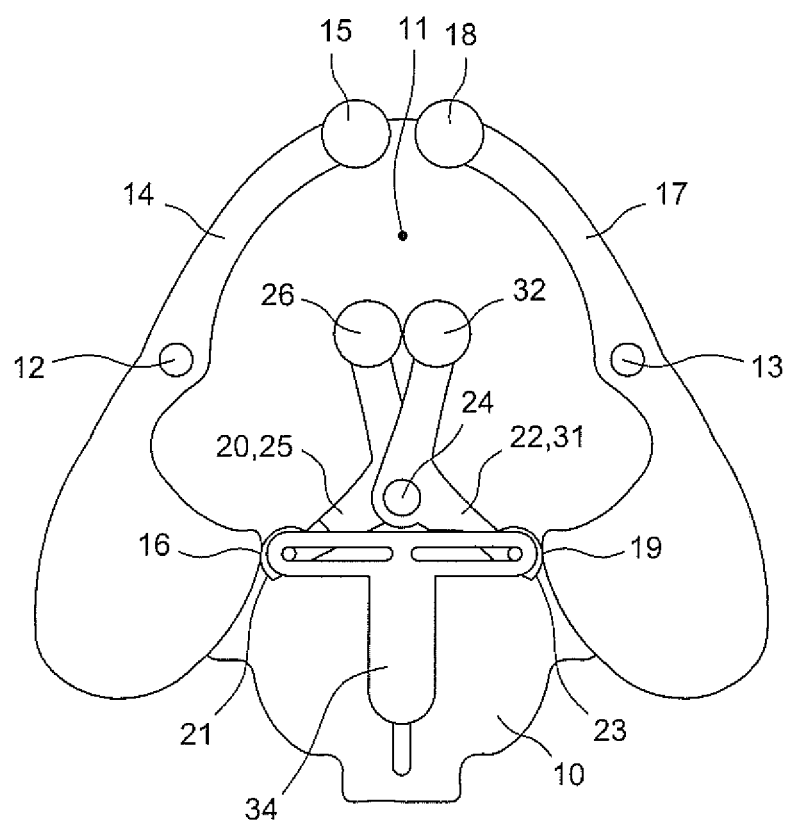
FIG. 3A is a top plan view of a third preferred embodiment of the self-centering mechanism constructed in accordance with the present invention.
Figure 3B:
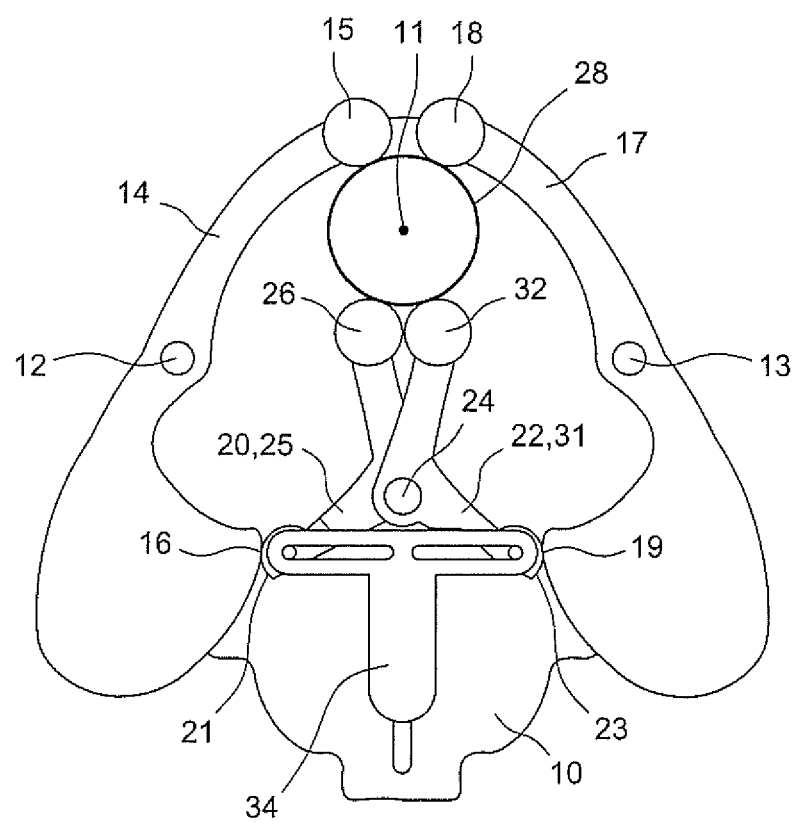
FIG. 3B is a top plan view of a third preferred embodiment of the self-centering mechanism constructed in accordance with the present invention releasably engaged with a smaller circular object in a self-centering manner.
Figure 3C:
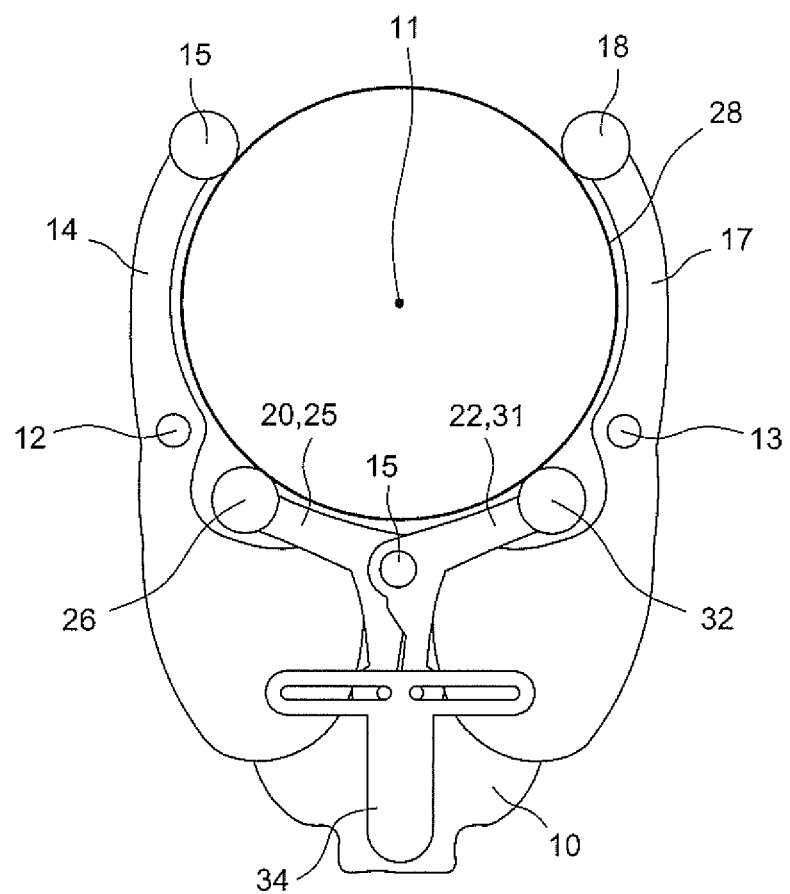
FIG. 3C is a top plan view of a third preferred embodiment of the self-centering mechanism constructed in accordance with the present invention releasably engaged with a larger circular object in a self-centering manner.

The third preferred embodiment of the self-centering mechanism FIGS. 3A-3C is a slight permutation of the second preferred embodiment of the self-centering mechanism, where a simple intermediate member is utilized to guarantee equal motion of the third and fourth arms, without a large increase in device size or complexity. This centering member 34 can be utilized with a torsional spring such that the ends move in self-centering manner relative to the alignment axis 11. In FIG. 3B, the tangential surface sets 16, 21 and 19, 23 are the means of the tangential motion between the first arm and first tangential member, and the second arm and second tangential member, however, the means are just an example of possible tangential members, whereas these tangential members could be substituted for another means, such as but not limited to, gears or rack and pinion components. The use of surfaces as the tangential members are used as the primary example throughout the remainder of the figures, solely due to the prevalence in choice of design due to their lower cost to manufacture and assembly compared to other tangential members.

Figure 4:
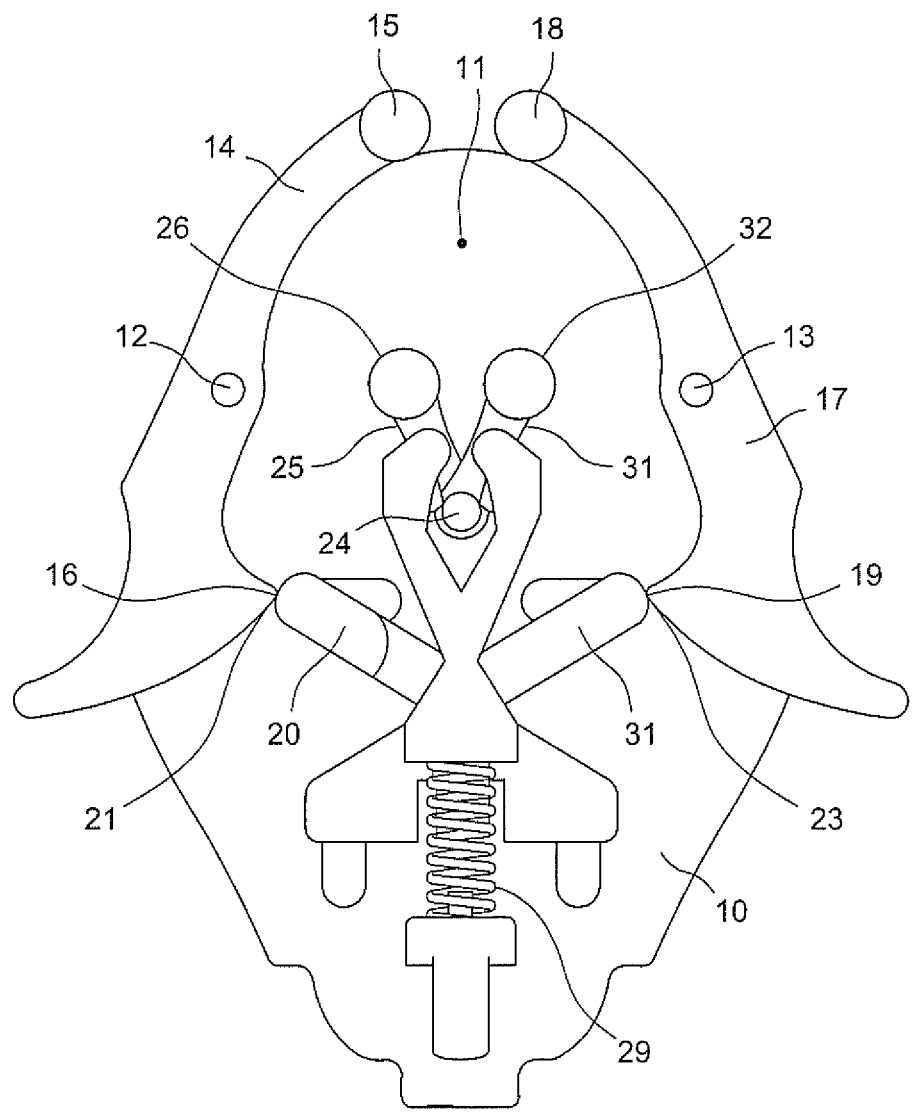
FIG. 4 is a top plan view of a fourth preferred embodiment of the self-centering mechanism constructed in accordance with the present invention.
Figure 5:
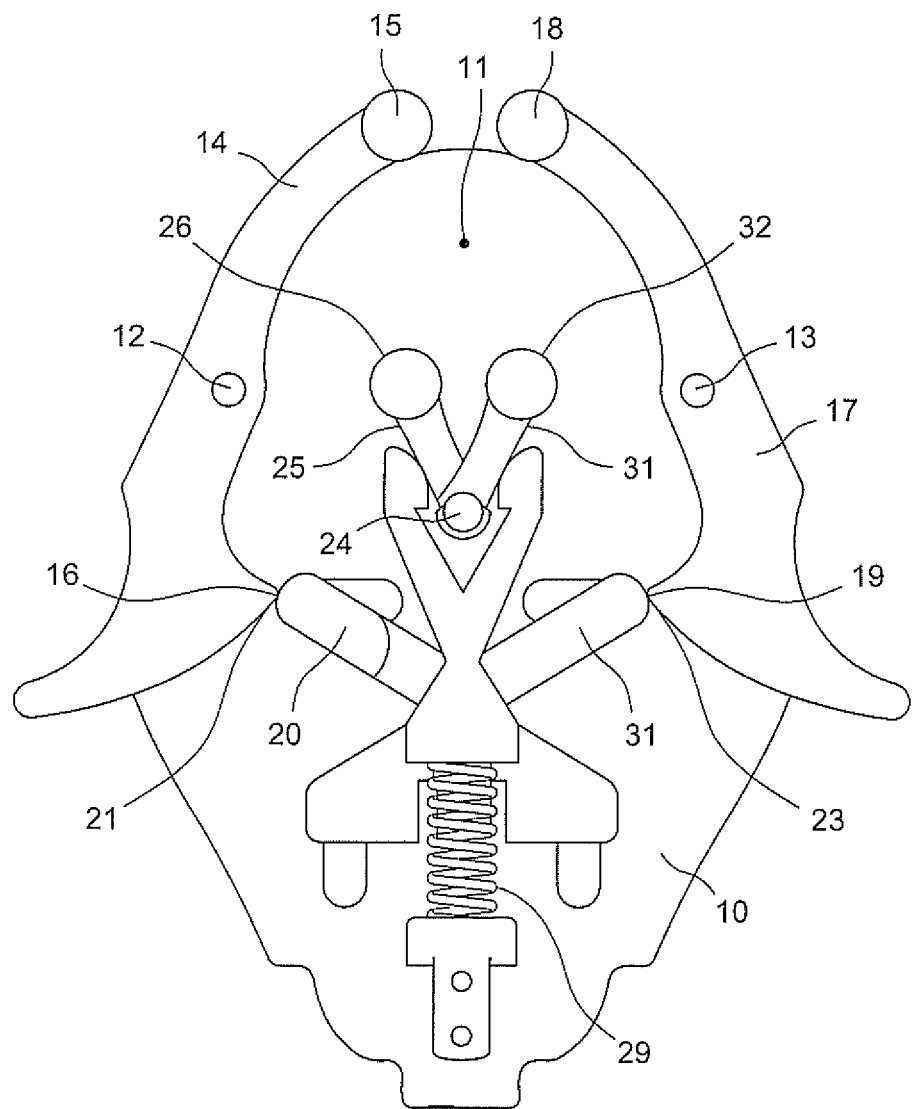
FIG. 5 is a top plan view of a fifth preferred embodiment of the self-centering mechanism constructed in accordance with the present invention.
Figure 6:
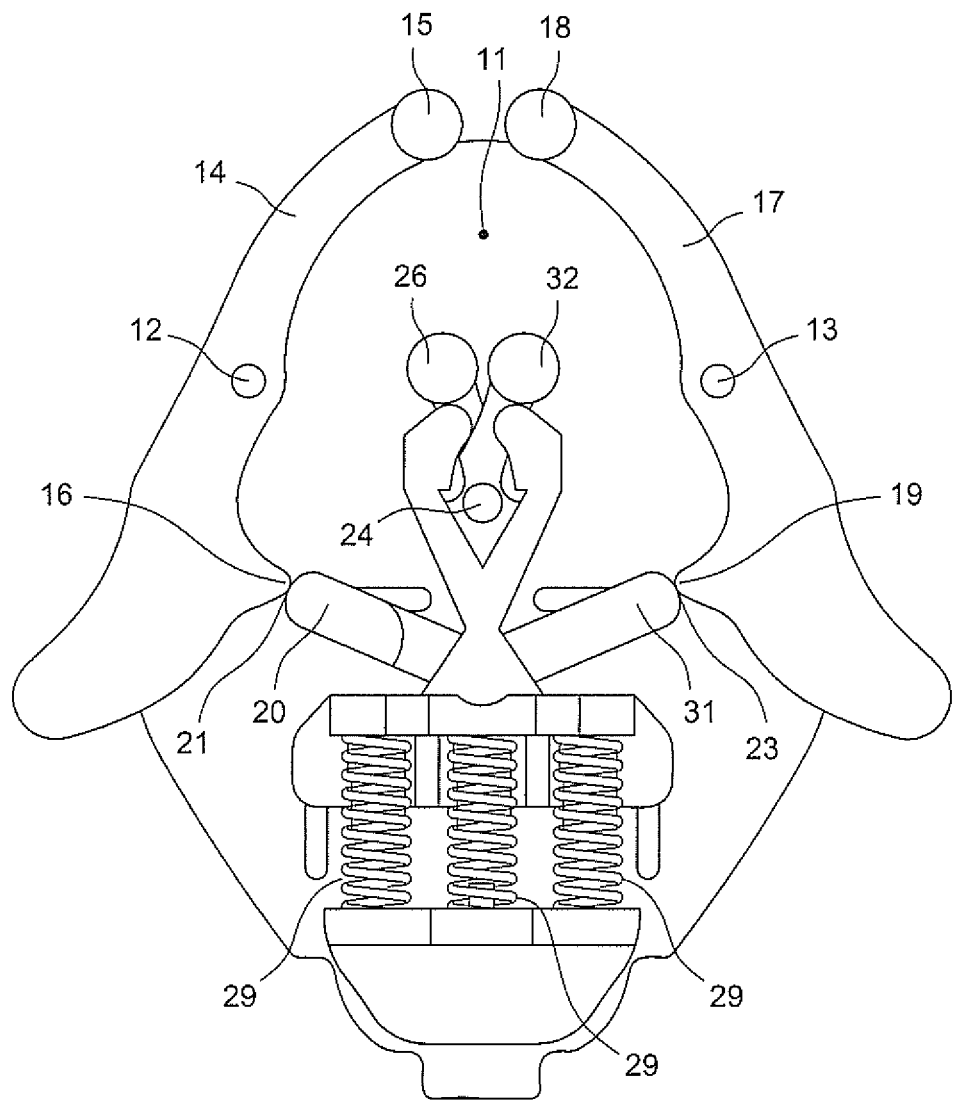
FIG. 6 is a top plan view of another preferred embodiment of the self-centering mechanism constructed in accordance with the present invention utilizing multiple bias members.
Figure 7A:
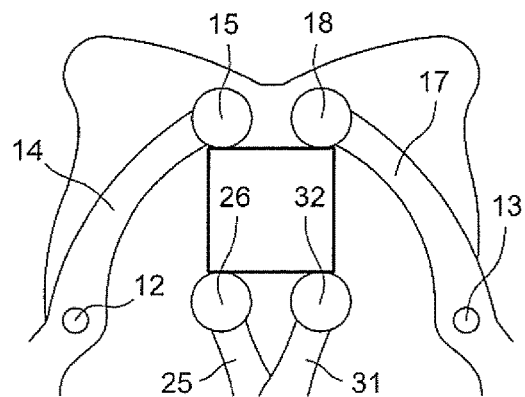
FIG. 7A is an inset view of the second preferred embodiment of the self-centering mechanism constructed in accordance with the present invention releasably engaged with a square object in a self-centering manner.
Figure 7B:
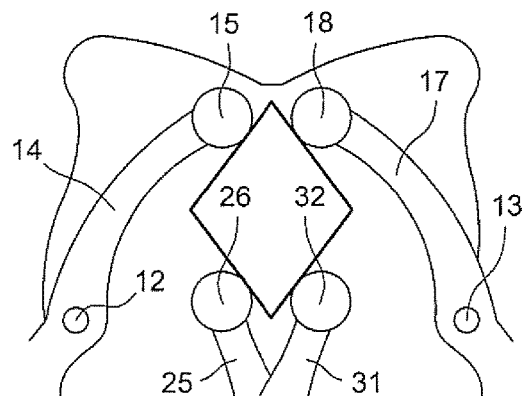
FIG. 7B is an inset view of the second preferred embodiment of the self-centering mechanism constructed in accordance with the present invention releasably engaged with a diamond shaped object in a self-centering manner.
Figure 7C:
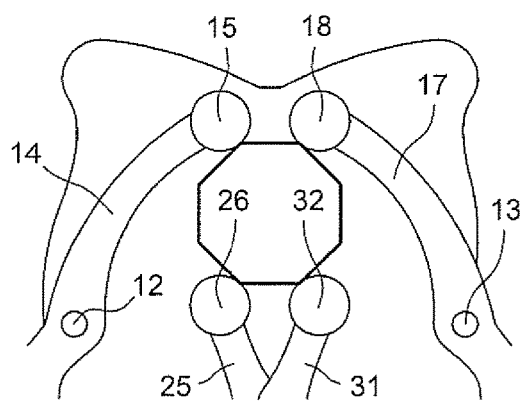
FIG. 7C is an inset view of the second preferred embodiment of the self-centering mechanism constructed in accordance with the present invention releasably engaged with a polygonal object in a self-centering manner.
Figure 7D:
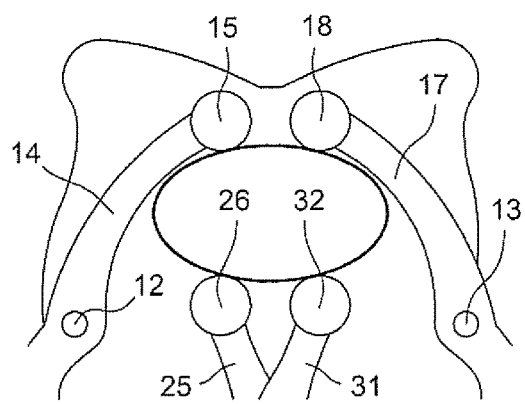
FIG. 7D is an inset view of the second preferred embodiment of the self-centering mechanism constructed in accordance with the present invention releasably engaged with an elliptical object in a self-centering manner.

Additional embodiment of the self-centering mechanisms are shown in FIGS. 4, 5 and 6, depicting other coupling between the third or fourth arms and the tangential members, as well as the use of additional bias members 29 depending on the clamping forces required. The biased mechanism can be achieved by one or more members, such as but not limited to, compression springs, extension springs, torsional springs, constant force springs, material based springs, cantilever, leaf spring, elastomeric element, gas spring, pneumatic element or a combination thereof. All of the embodiments shown of the self-centering mechanism can additionally include a cover, which hides most of the mechanism for aesthetic reasons.

FIG. 1-6 have depicted the retaining of circular or cylindrical shaped objects, however, the self-centering mechanism can releasably engaged in a self-centering manner with a variety of objects, where the objects having an alignment axis, and at least one cross-section of the object having two planes of symmetry. FIG. 7A-D inset views show various cases of objects, square, diamond, polygon, and ellipse, respectively, which satisfy the self-centering requirement. In this example, the ends meet at least tangentially with the objects. However, it should also be noted that the shape out of the plane can be of various sizes and shapes, such that a cylindrical object may also be tapered or have a curved shaped out of the plane. The ends, 15, 18, 26, 32, can be constructed to conform to a variety of shapes, such that the ends preferably include a soft to medium stiffness elastomeric coating or member. The elastomeric portion allows for additional grip without marring of the surface of the object and for the self-centering mechanism to conform and securely retain objects with various in-plane and out-of-plane shapes. Furthermore, the elastomeric portion allows for minimal vibration to be placed on the object when grasped by the self-centering device. For instance, in the case of a telescope eyepiece in the self-centering mechanism, any vibrations from self-centering mechanism could be imparted to the telescope and would be detrimental to the image quality. However, in this instance, the elastomeric or rubber portions could additionally act as a vibration damper. A preferred embodiment of the elastomeric portion is a cylindrical rubber with an inner tapered cut-out, which mates with a tapered plastic portion, such that the degree of conformance is linearly changing in the out-of-plane direction. Therefore, such an embodiment of the elastomeric element can be designed, such that most objects that are straight in the out-of-plane direction are retained properly, but also objects which are tapered or expanding outwards in the out-of-plane direction can be retained strongly. Additionally, the rubber components can easily include one or more 'glow in the dark' ingredients in its chemical composition, such that during dark or low-light situations, the user can easily distinguish where to place the self-centering mechanism.

The alignment axis of the self-centering mechanism can be placed at true center or intentionally offset due to the weight of the objects or devices connected to the self-centering mechanism. In such cases, there may be a weight that biases the self-centering mechanism towards a specific direction, such as the weight of an extremely heavy object. In this case, if a known range of weights are known at the time of the design, the self-centering mechanism can be designed to account for this, by offsetting the alignment axis such that the heavy objects or devices do not result in an off-centered object, but instead still properly retain the object in a self-centered manner.

The first preferred embodiment of the clamping device for an electronic device 40 is depicted in FIG. 8A-D. The electronic device can be within a case or bare, such that either the case contain the electronic device or the electronic device itself has a first side 41, second side 42 (not shown), and third side 43. The main body of the clamping device 36 includes at least one pivot axis 39, which can be in the plane shown in FIG. 8A or out of the plane. The first holder portion 44 rotates about the pivot axis, with a bias member preferentially rotating the first end of the first holder portion 45 until it makes partial contact with the first side 41. The first holder portion can also include a lever 48 for ease of user actuation of the first holder portion, which may include a rubber or textured coating or member for ease of use. The second holder portion 46 includes a first surface 47 which makes at least partial contact with the third side 43. The first surface of the main body 37 is in contact with the second side, in this case, the rear of the phone, which is not shown from the depicted plane while the electronic devise is in the retained state. FIG. 8A-D show a smaller rectangular electronic device, a larger rectangular electronic device, a smaller curved electronic device, and a larger curved electronic device in the retained state, which in this example is a phone. The first end 45 would be shaped and constructed to make contact with the electronic device or the case retaining the electronic device, such as but not limited to: a circular or cylindrical member, an elastomeric coating or member, or an additional member with a surface on an additional pivot. In these cases, the partial contact could be tangential, at least tangential and conforming, or between surfaces. The first end could also be contoured in an out-of-plane direction with an outwardly tapered or curved in shape, so as to more ideally retain the device. Furthermore, an end with an elastomeric coating or element would aid the device in retaining electronic devices with out-of-plane curves or shapes. The second holder portion can also include an elastomeric coating or element, so that the first surface can conform to the in-plane and out-of-plane curvature of the electronic device, or case of the electronic device.

Figure 8A:
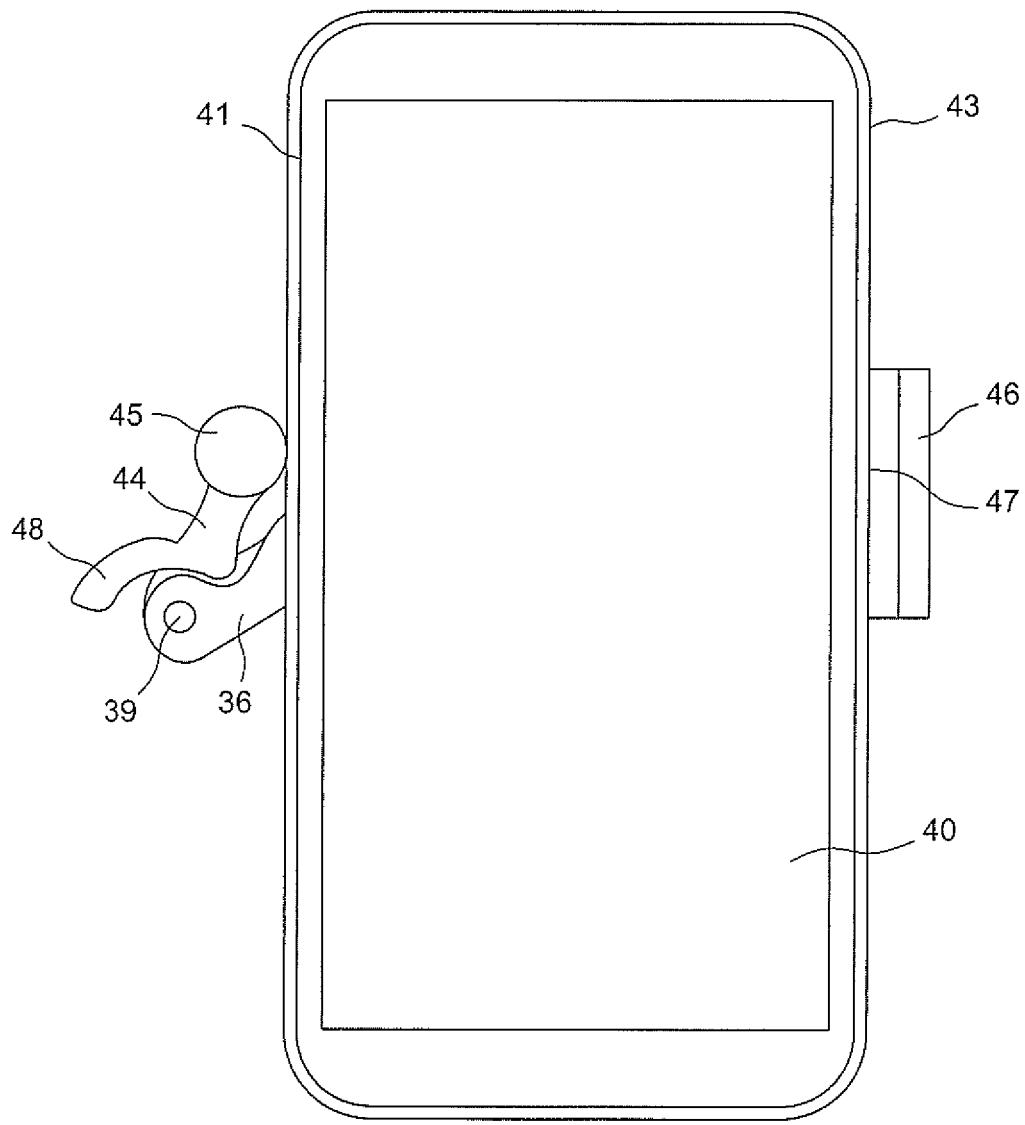
FIG. 8A is a top plan view of a first preferred embodiment of the clamping device for an electronic device constructed in accordance with the present invention, depicted with a smaller sized rectangular phone in the retained state.
Figure 8B:
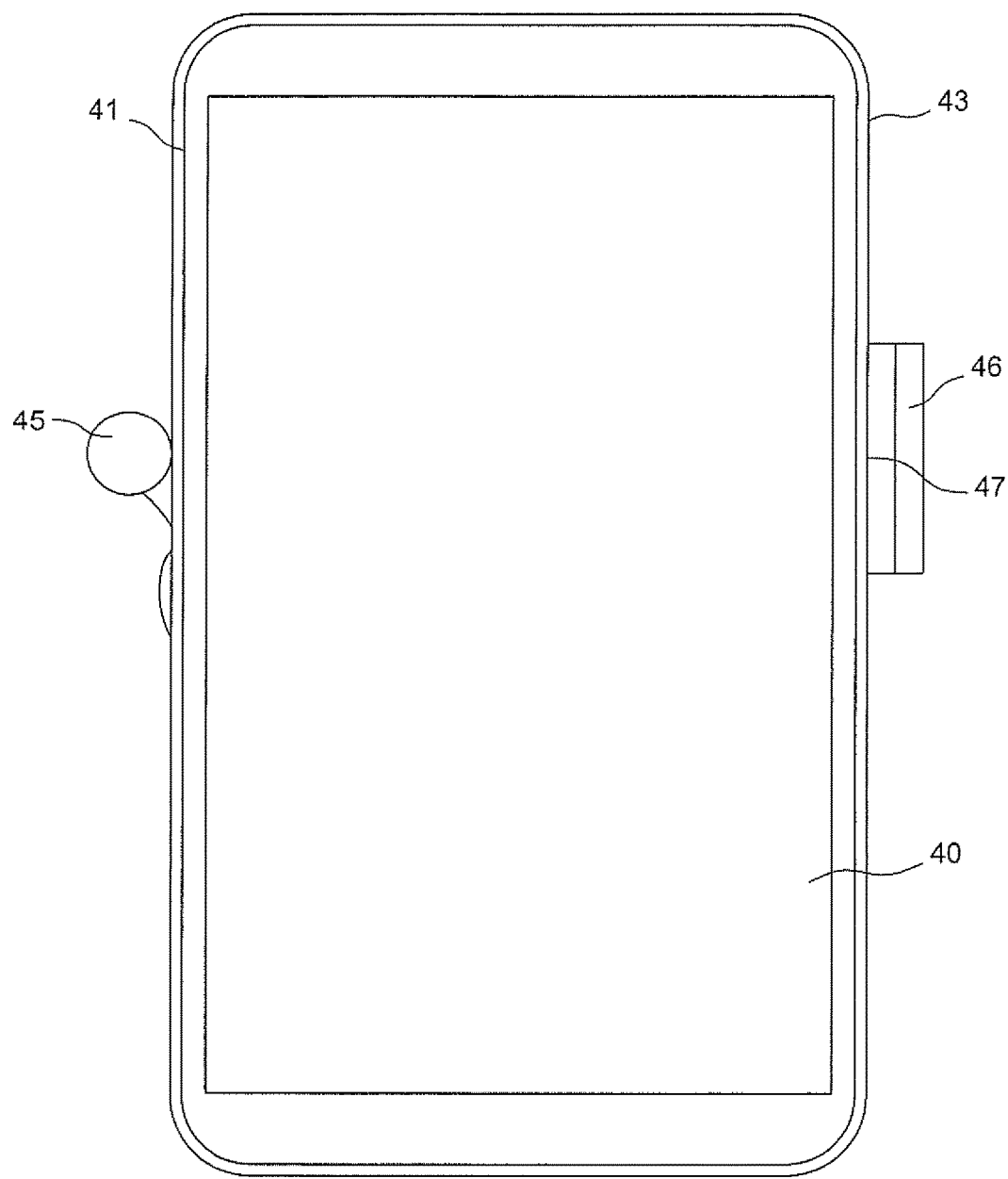
FIG. 8B is a top plan view of a first preferred embodiment of the clamping device for an electronic device constructed in accordance with the present invention, depicted with a larger sized rectangular phone in the retained state.
Figure 8C:
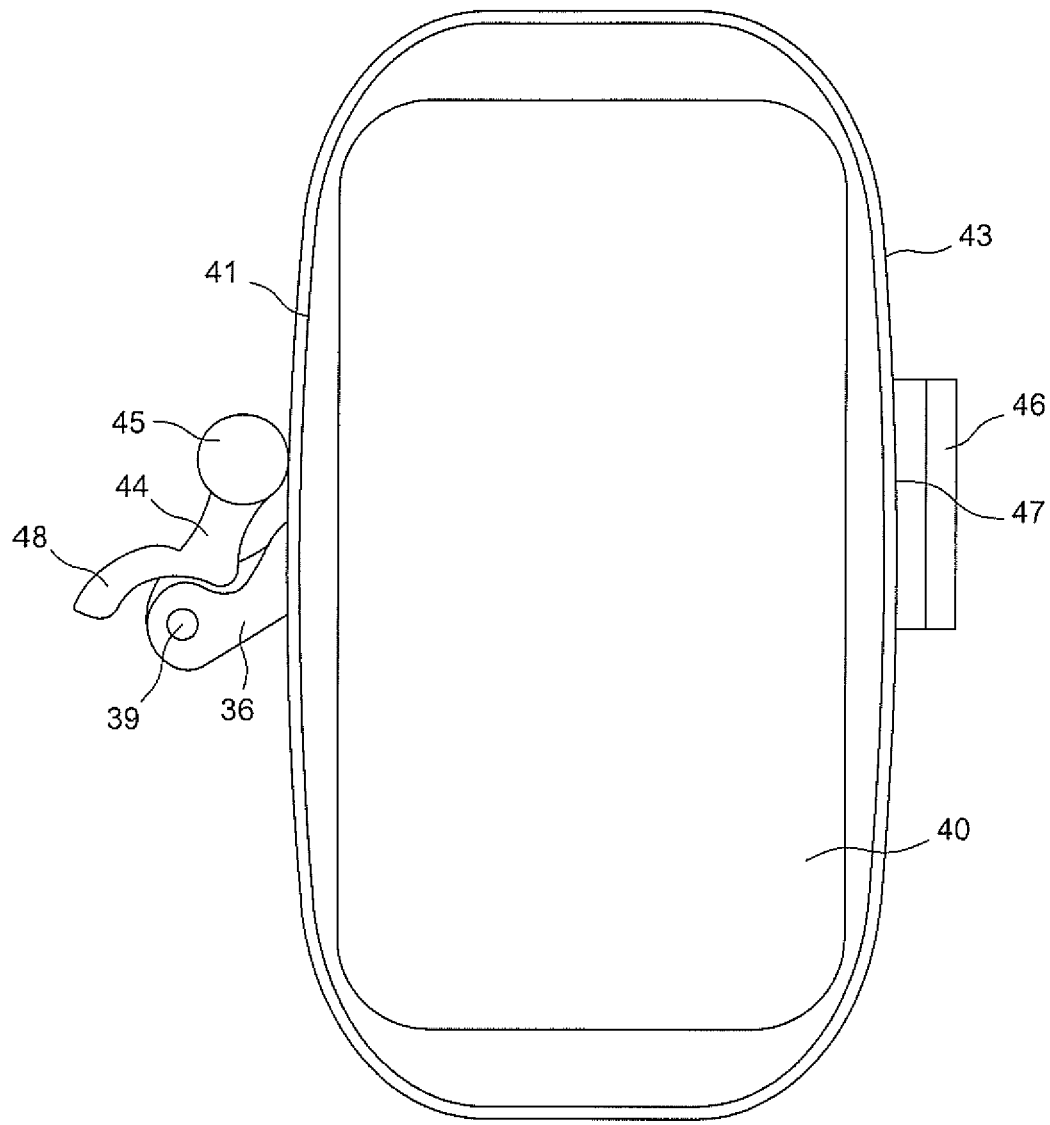
FIG. 8C is a top plan view of a first preferred embodiment of the clamping device for an electronic device constructed in accordance with the present invention, depicted with a smaller sized curved phone in the retained state.
Figure 8D:
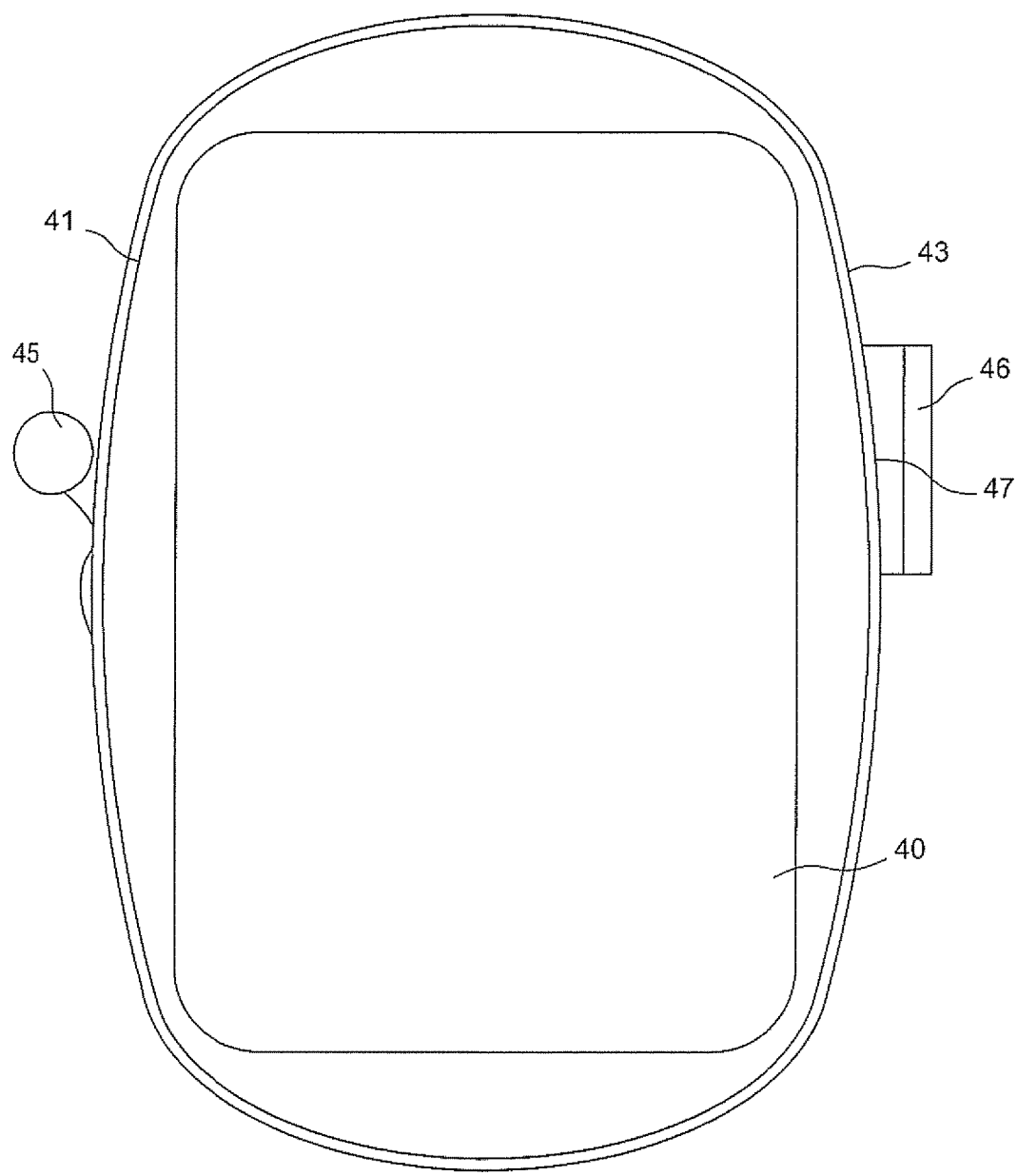
FIG. 8D is a top plan view of a first preferred embodiment of the clamping device for an electronic device constructed in accordance with the present invention, depicted with a larger sized curved phone in the retained state.
Figure 8E:
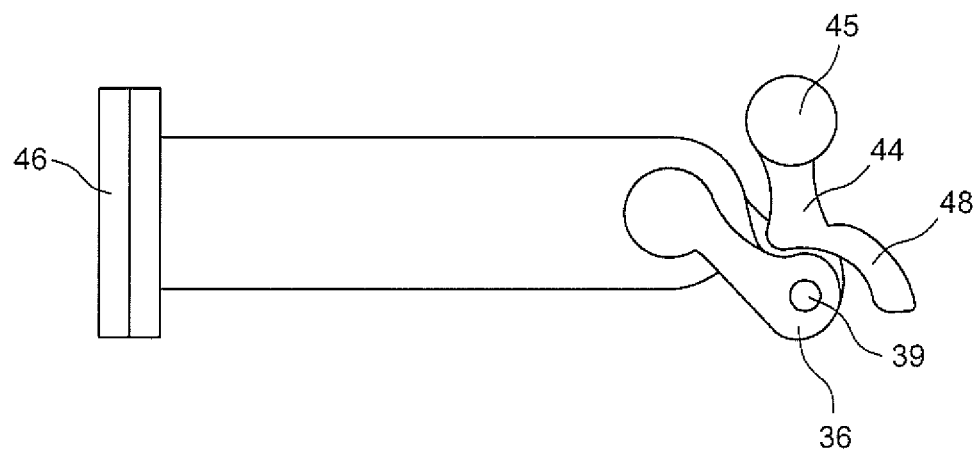
FIG. 8E is a top plan view of a first preferred embodiment of the clamping device for an electronic device constructed in accordance with the present invention, depicted without an electronic device.
Figure 9A:
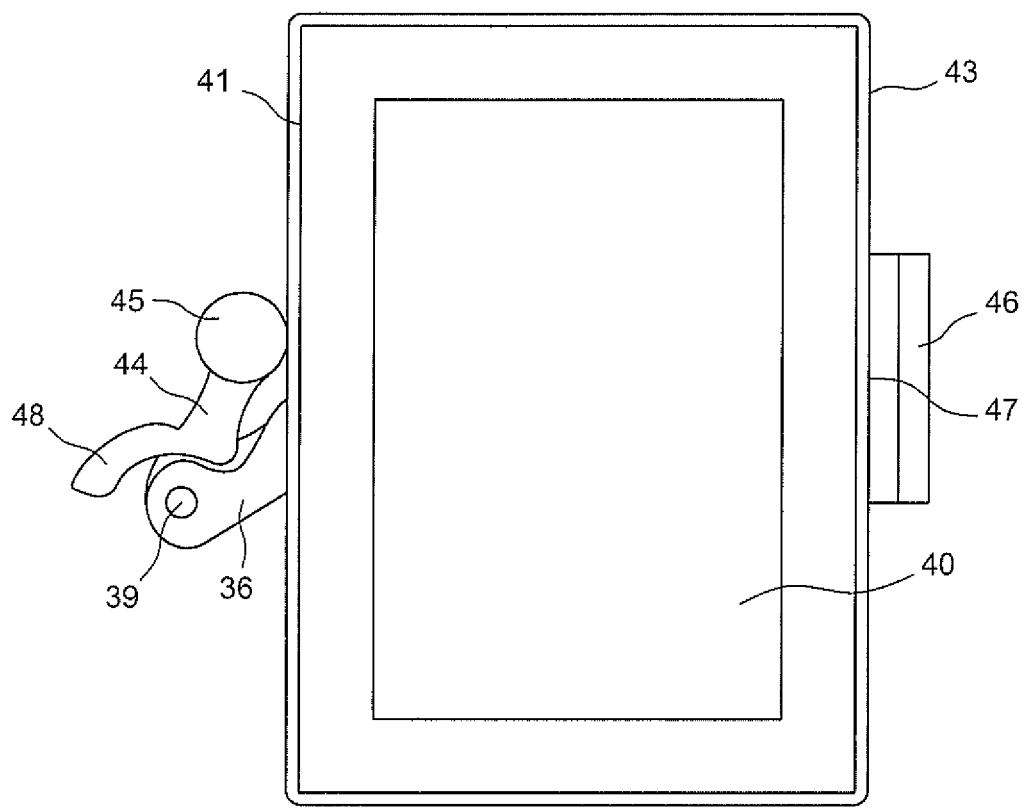
FIG. 9A is a top plan view of a second preferred embodiment of the clamping device for an electronic device constructed in accordance with the present invention, depicted with a smaller sized tablet in the retained state.
Figure 9B:
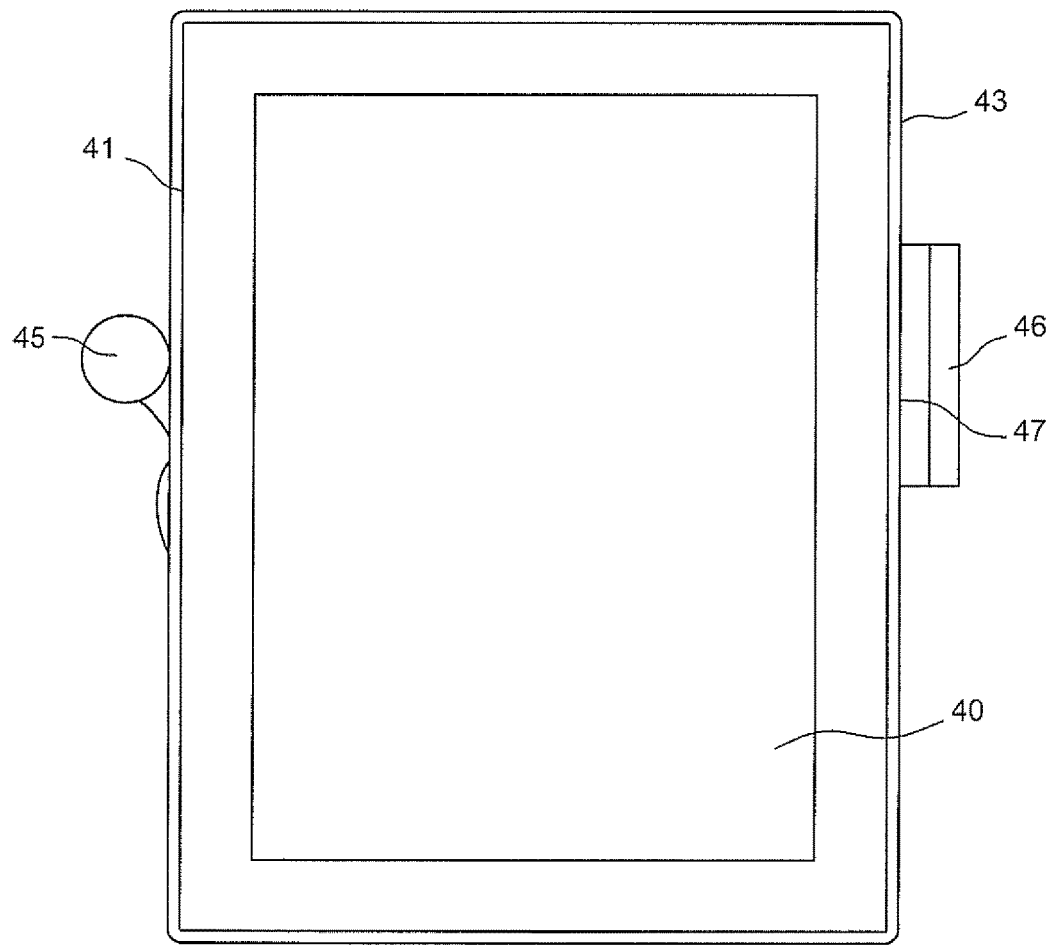
FIG. 9B is a top plan view of a second preferred embodiment of the clamping device for an electronic device constructed in accordance with the present invention, depicted with a larger sized tablet in the retained state.
Figure 9C:
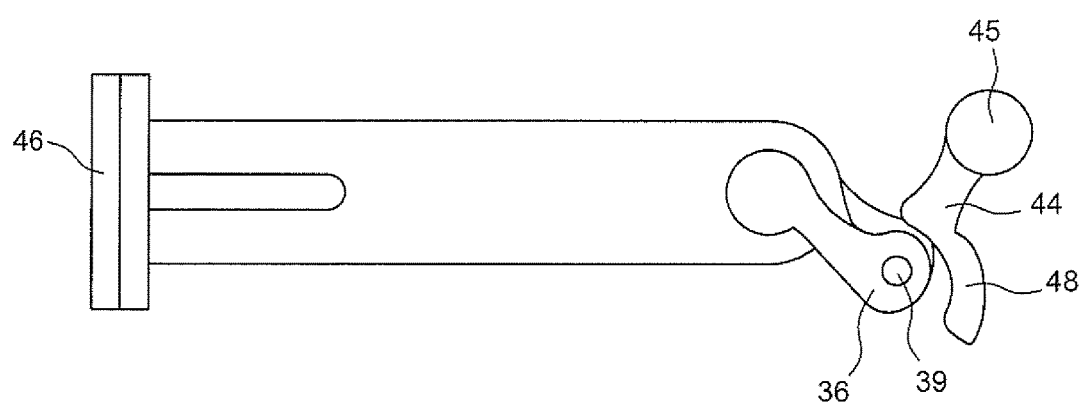
FIG. 9C is a top plan view of a second preferred embodiment of the clamping device for an electronic device constructed in accordance with the present invention, depicted without an electronic device.

FIG. 8E shows the compact size of the device, which is highly portable, or could be easily configured to attach to an another device or mechanism, such as but not limited to an external mounting surface, a self-centering mechanism, a ball joint, a suction cup, an adhesive member, a clamp, or a tripod. The first embodiment is an example of a device that fit most phones up to 3.8″ wide. FIG. 9A/B demonstrate the scalability of the device, such that a second preferred embodiment of the device can be utilized to hold a range of sizes of large objects like a tablet, wherein FIG. 9A shows a small tablet, and FIG. 9B shows a large tablet.

Figure 10A:
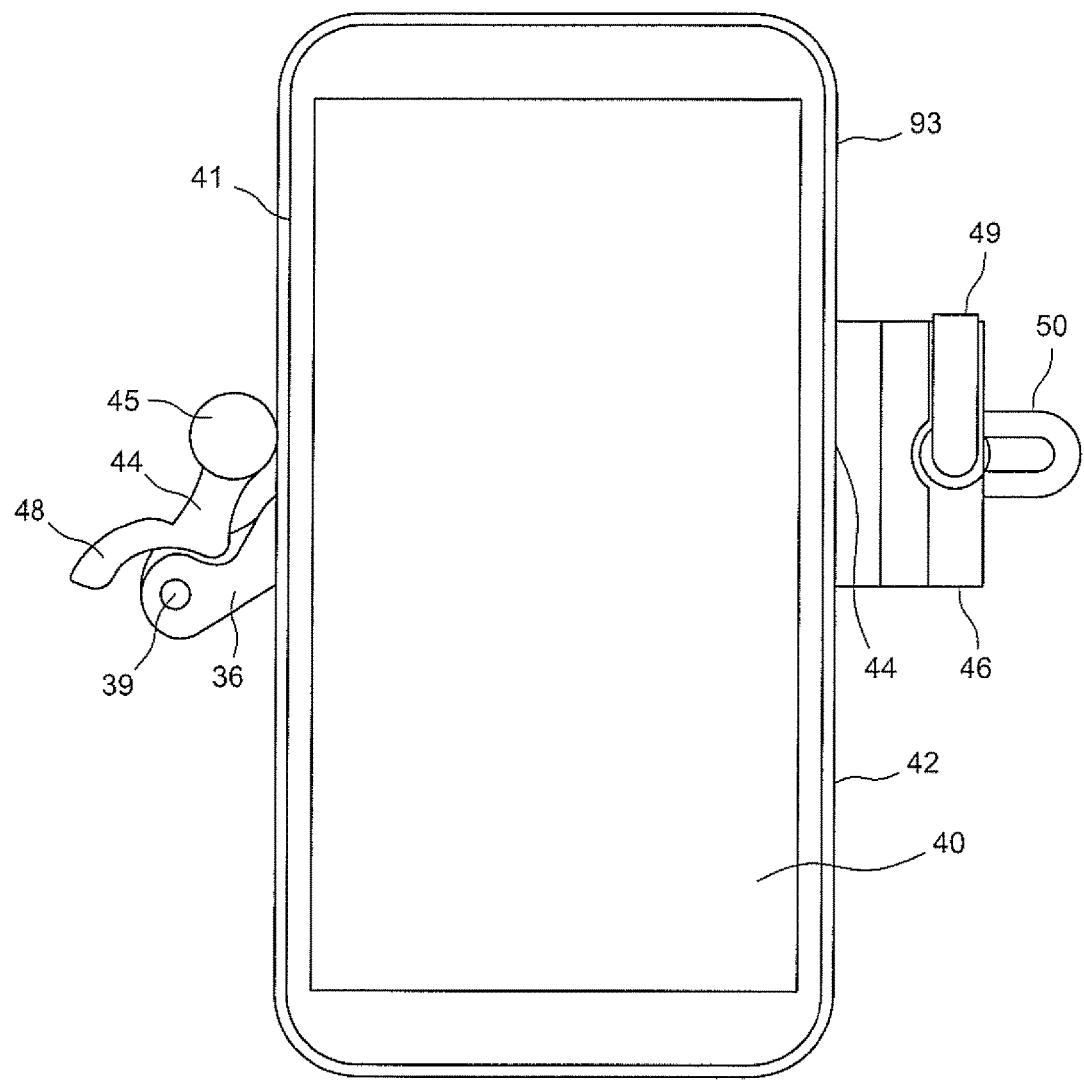
FIG. 10A is a top plan view of a third preferred embodiment of the clamping device for an electronic device constructed in accordance with the present invention, depicted with a smaller sized phone in the retained state.
Figure 10B:
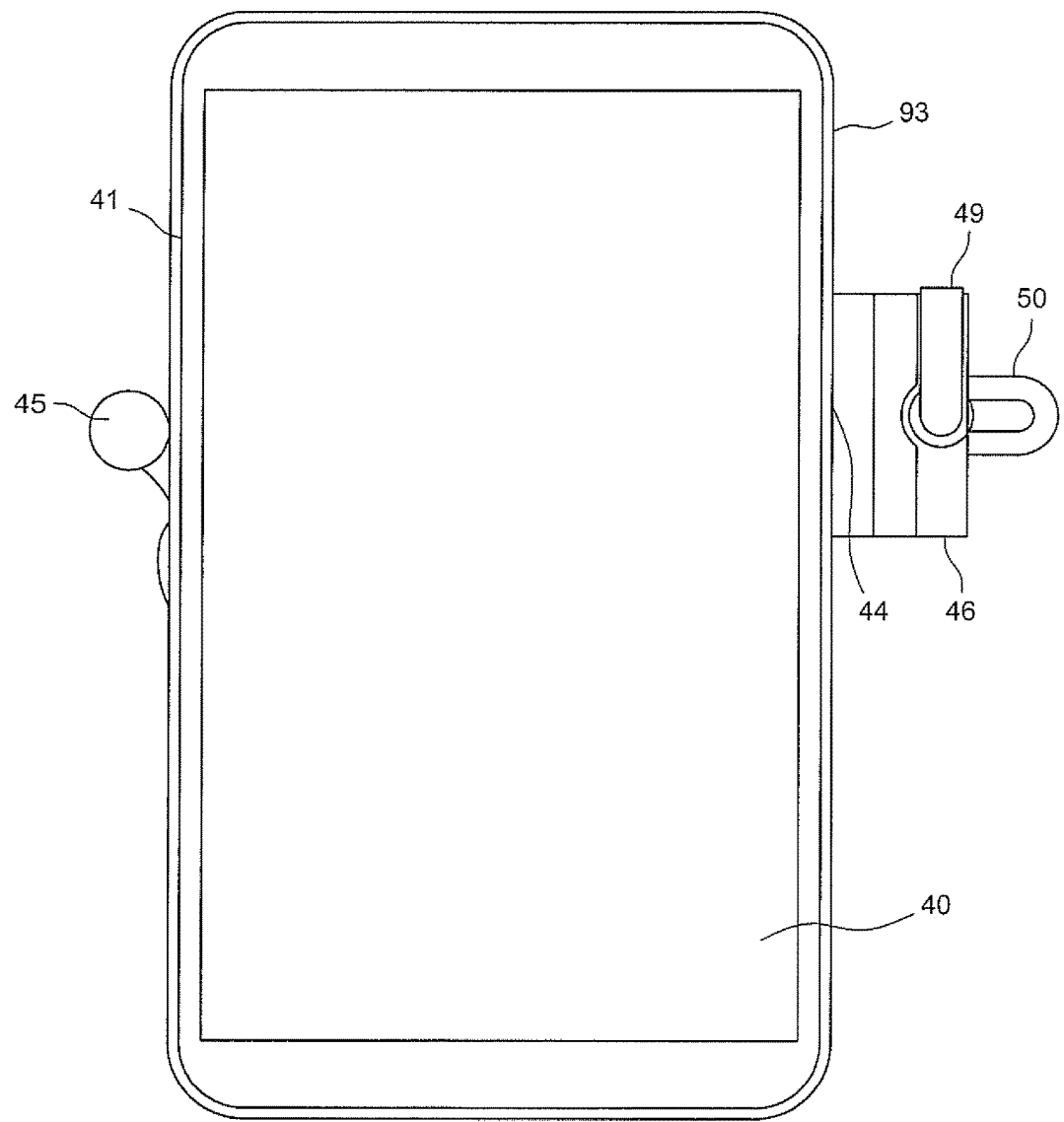
FIG. 10B is a top plan view of a third preferred embodiment of the clamping device for an electronic device constructed in accordance with the present invention, depicted with a larger sized phone in the retained state.
Figure 10C:
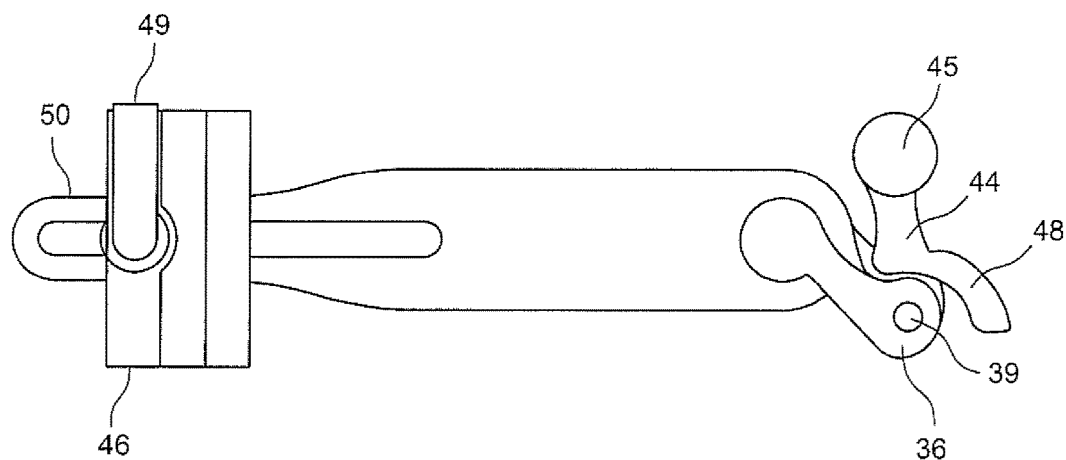
FIG. 10C is a top plan view of a third preferred embodiment of the clamping device for an electronic device constructed in accordance with the present invention, depicted without an electronic device.

A third preferred embodiment of the clamping device FIG. 10A-C allows for the positioning of the electronic device in a first direction, utilizing a means for a linear adjustment 50. In this example, the means for a linear adjustment is a linear track, but this may be accomplished by various means, including but not limited to, a linear track, a threaded rod, a rack and pinion, a discrete track, a curved track, one or more telescopic members, or a combination thereof. In this use to make a positional alignment of the electronic device, it is advantageous to have at least one lock point 49 or locking mechanism to hold the second holder portion in the desired position. The locking point or locking mechanism could be a variety of locks or clamps, such as but not limited to, a screw, a cam lever clamp, alligator clamp, vice clamp, hook clamps, pull clamp, snap clips, snap-fit, bayonet clamp, circular clamp, clamping collar, hose clamps, C-clamps, bar clamps, band camps, corner camps, magnetic clamps, spring clamp, toggle clamps, wedge clamps, swing clamps, toe clamps, or any combination thereof. This second preferred embodiment of the clamping device with a linear adjustment of the second holder portion can be used for several applications, such as to further extend the range of electronic devices or cases retaining an electronic device that can be clamped in the device, or to align a part of the electronic device such the camera or illumination means to another device or surface.

Figure 11A:
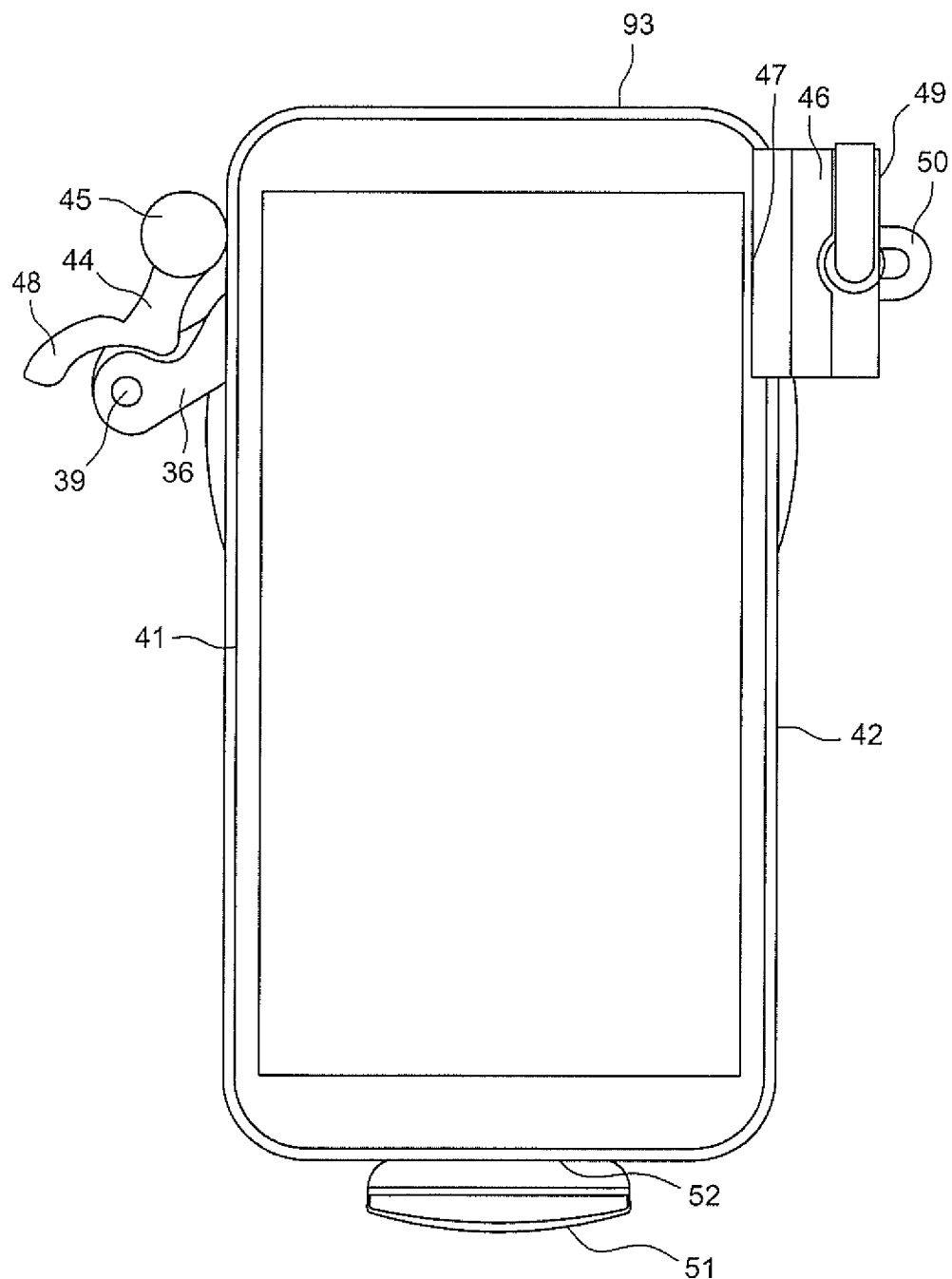
FIG. 11A is a top plan view of a fourth preferred embodiment of the clamping device for an electronic device constructed in accordance with the present invention, depicted with a smaller sized phone in the retained state.
Figure 11B:
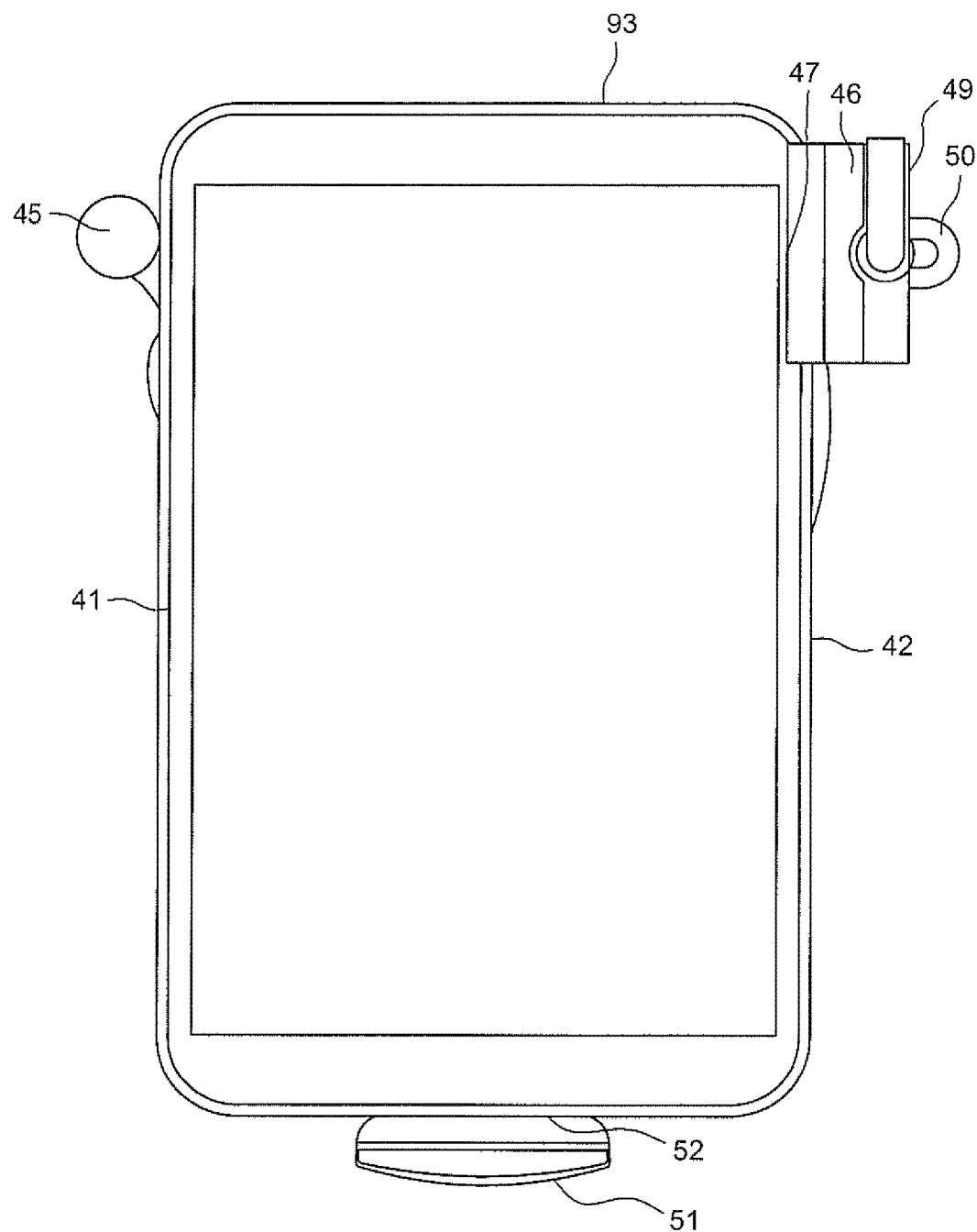
FIG. 11B is a top plan view of a fourth preferred embodiment of the clamping device for an electronic device constructed in accordance with the present invention, depicted with a larger sized phone in the retained state.
Figure 11C:
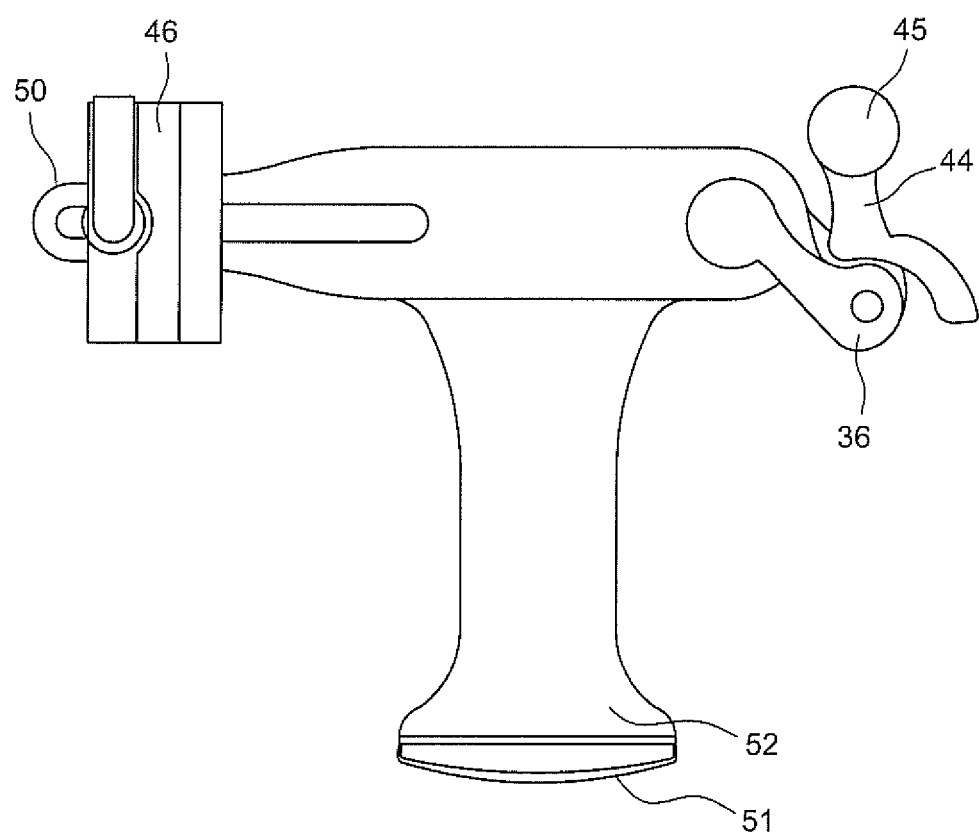
FIG. 11C is a top plan view of a fourth preferred embodiment of the clamping device for an electronic device constructed in accordance with the present invention, depicted without an electronic device.

A fourth preferred embodiment of the clamping device FIG. 11A-C allows for the positioning of the electronic device in a second direction beyond the second preferred embodiment by utilizing a third holder portion 51 with a first surface of the third holder portion 52 making partial contact with at least one side of the electronic device or case. Any additional holders could be of various geometries, including but not limited to, a straight holder like the second holder, a cylindrical holder, or a corner holder, or a curved U- or V-shaped holder or any combination thereof. In this embodiment, the user just retracts the first holder portion using the lever, then can either slide the electronic device down into or place it on the clamping device, such that the second and third portions make at least partial contact with the electronic device or case, then releases so the first holder portion retains the electronic device. The fourth embodiment is an example of a device that fits most phones up to 3.8" wide and up to 5.5" long. With an additional means of linear adjustment and an additional lock point for the third holder portion, the electronic device can be retained and aligned to another device using this clamping device.

Figure 12A:
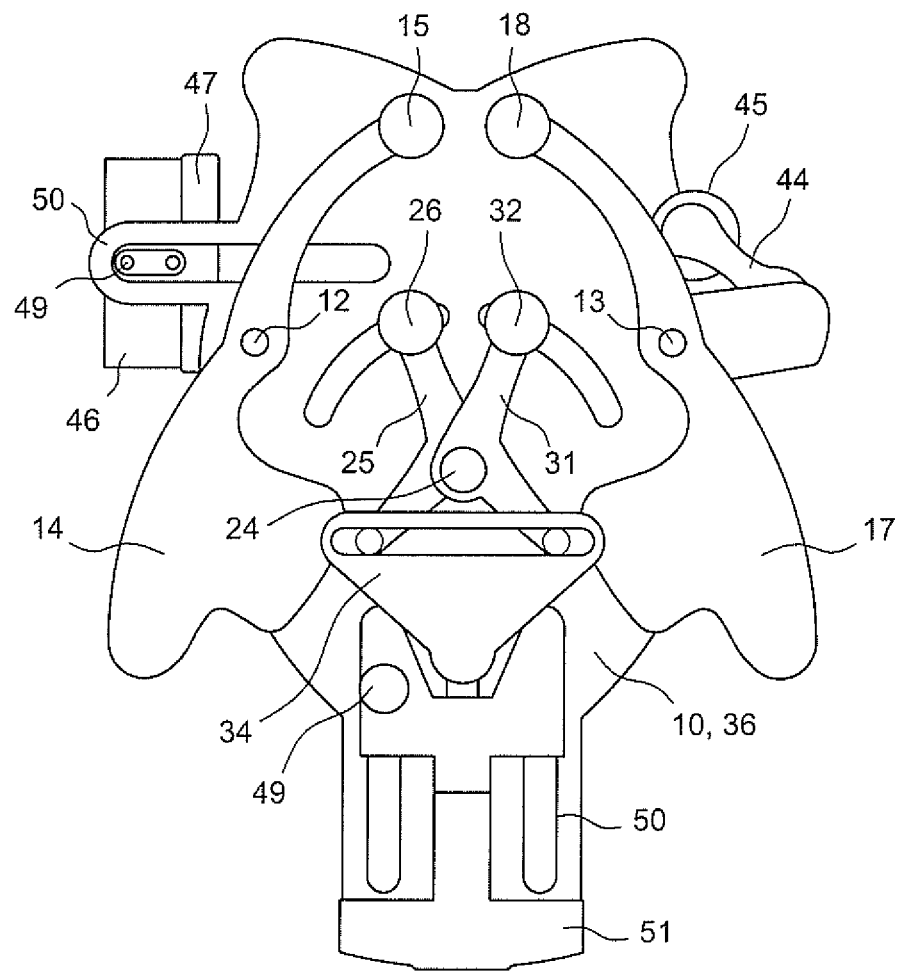
FIG. 12A is a top plan view of a first preferred embodiment of the self-centering adapter for an electronic device constructed in accordance with the present invention.
Figure 12B:
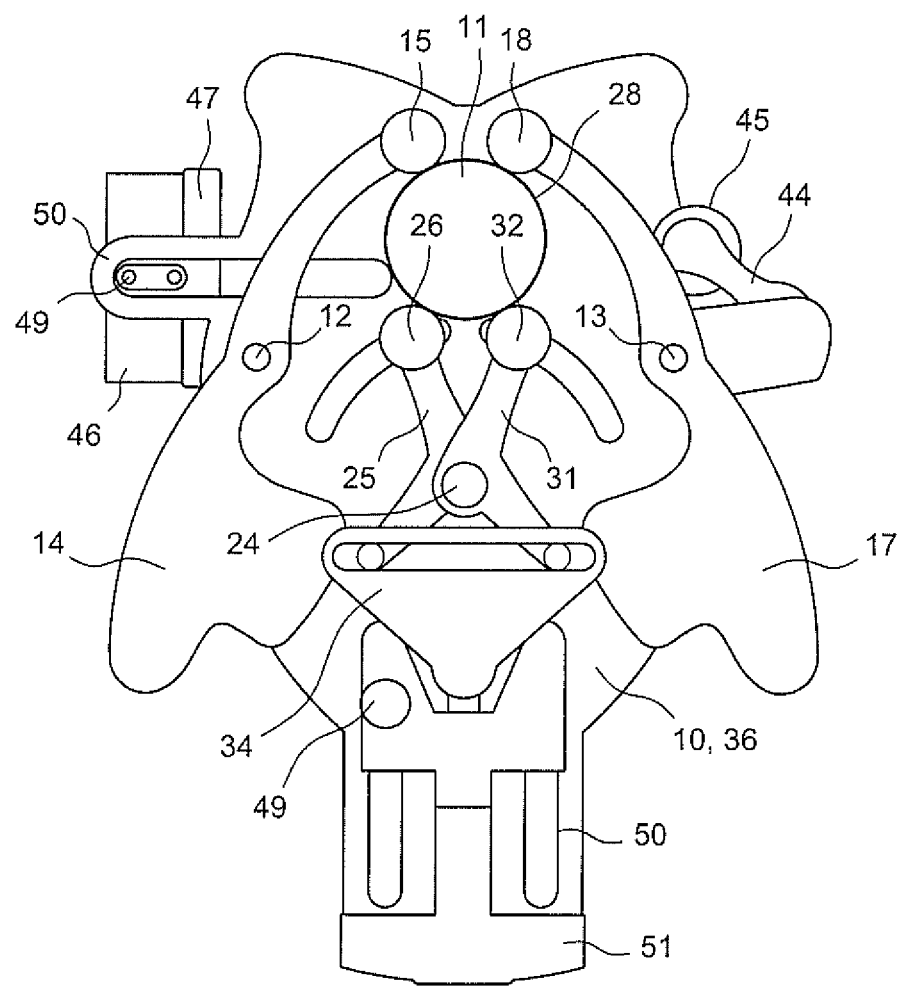
FIG. 12B is a top plan view of a first preferred embodiment of the self-centering adapter for an electronic device constructed in accordance with the present invention, releasably engaged with a smaller circular object in a self-centering manner.
Figure 12C:
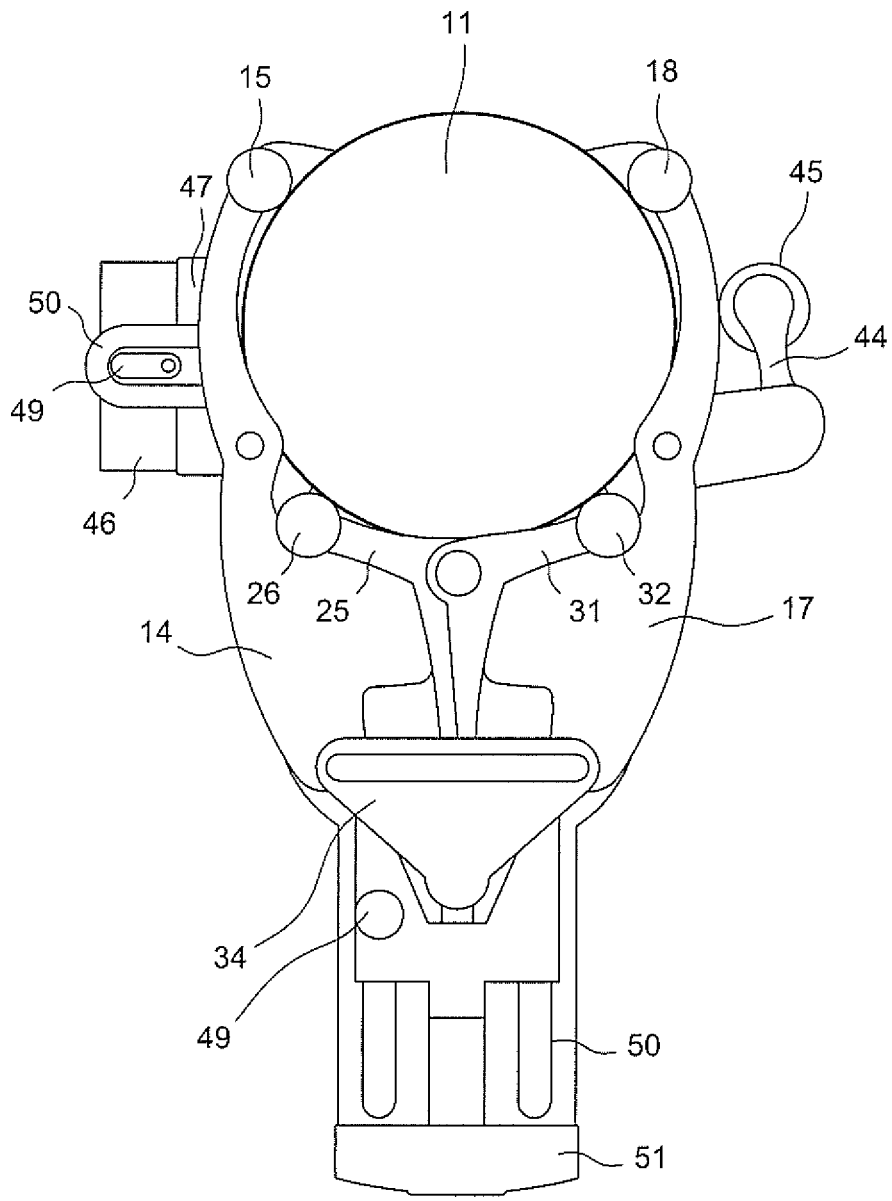
FIG. 12C is a top plan view of a first preferred embodiment of the self-centering adapter for an electronic device constructed in accordance with the present invention, releasably engaged with a larger circular object in a self-centering manner.
Figure 13A:
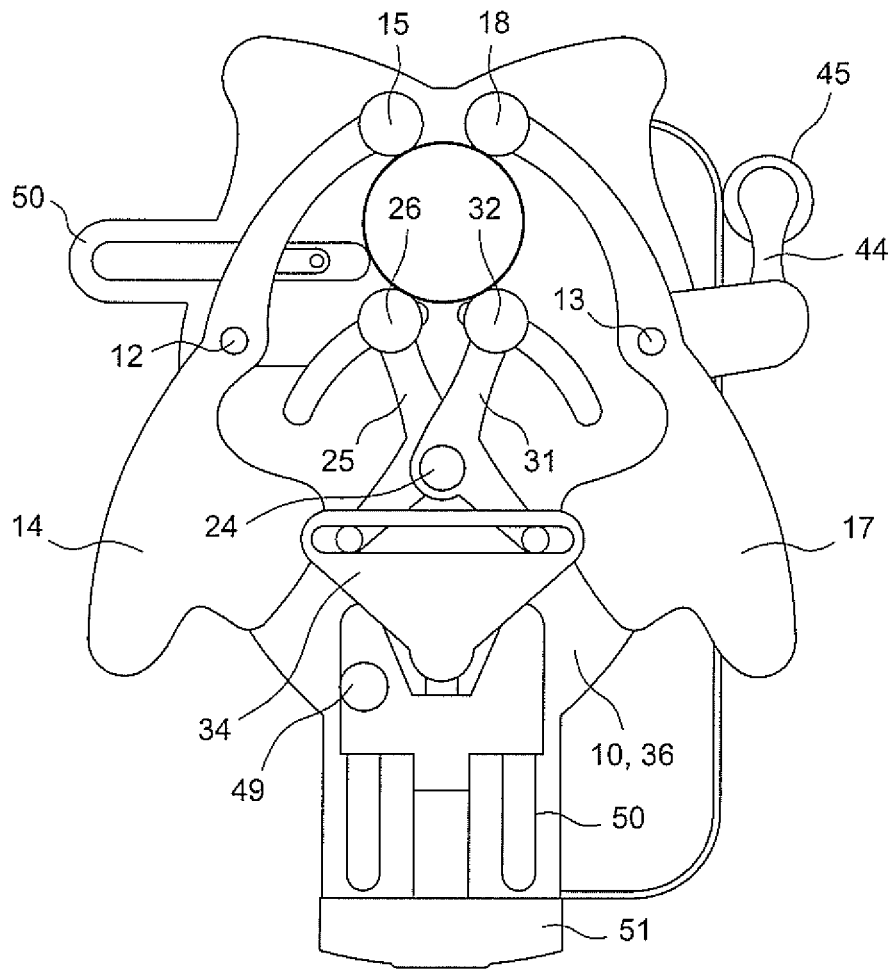
FIG. 13A is a top plan view of a first preferred embodiment of the self-centering adapter for an electronic device constructed in accordance with the present invention, depicted with a phone in the retained state and releasably engaged with a smaller circular object in a self-centering manner.
Figure 13B:
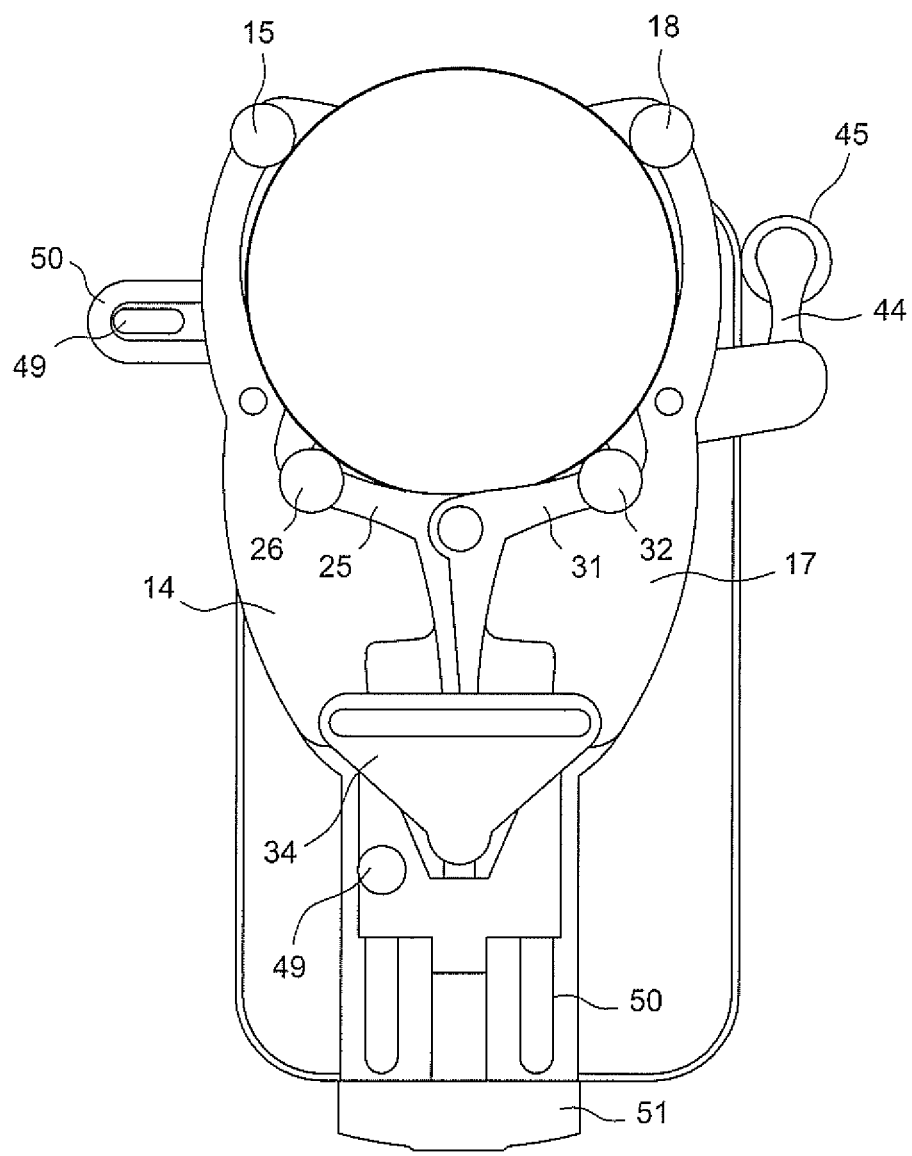
FIG. 13B is a top plan view of a first preferred embodiment of the self-centering adapter for an electronic device constructed in accordance with the present invention, depicted with a phone in the retained state and releasably engaged with a larger circular object in a self-centering manner.
Figure 14A:
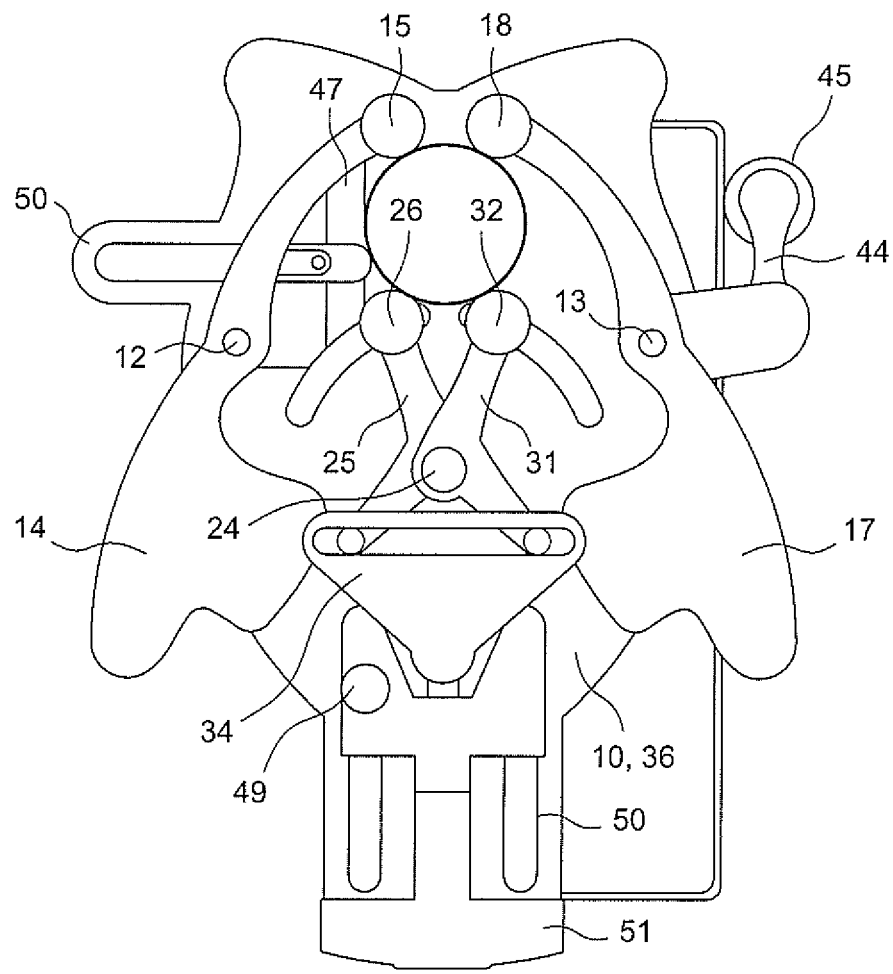
FIG. 14A is a top plan view of a first preferred embodiment of the self-centering adapter for an electronic device constructed in accordance with the present invention, depicted with a tablet in the retained state and releasably engaged with a smaller circular object in a self-centering manner.
Figure 14B:
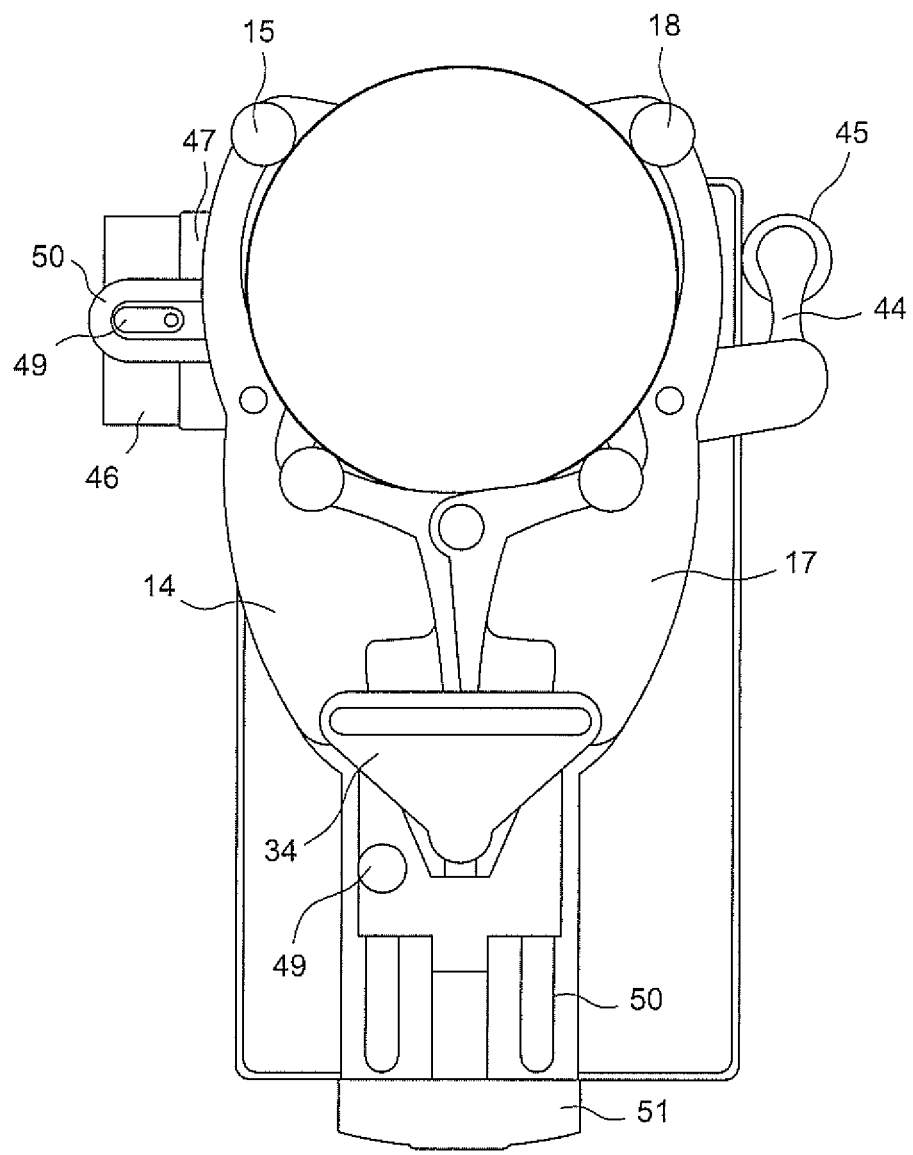
FIG. 14B is a top plan view of a first preferred embodiment of the self-centering adapter for an electronic device constructed in accordance with the present invention, depicted with a tablet in the retained state and releasably engaged with a larger circular object in a self-centering manner.

The self-centering mechanism and the clamping device for retaining an electronic device, can be integrated in the form of an adapter device as shown in FIG. 12A. In this example of the adapter, the third preferred embodiment of the self-centering mechanism FIG. 3 and the fourth preferred embodiment of clamping device FIG. 11 have been integrated. The main body of each can be integrated in a single component to minimize parts, and can minimize vignetting when used as an optical adapter. In this first embodiment of the adapter device, the third holder portion of the clamping device is shown as a telescopic member coupled to the main body, corresponding to a preferred compact construction. The self-centering mechanism is unaffected by the additional members of the clamping device, and can still releasably engage with objects in a self-centering manner as shown in FIG. 12B/C. The first and second holder portions can be placed above the pivot axes of the first and second arms, such that there is no conflict with the user actuation of the arms. FIG. 13A/B shows the same views as FIG. 12B/C but with the electronic device in the retained state. The self-centering mechanism and the clamping device can be coupled in various orientations with the same results. However, this orientation is preferred for its compact form. The rectangular shape of the self-centering device makes it ideal for this integrated adapter, as the entire device is only slightly larger than the parts retained by the adapter, namely, the object and electronic device. Additionally, the main body can be shaped to combine the two devices, for example, a cut-out for the first arm 44 shown in FIG. 14A and FIG. 14B. Therefore, such an adapter is a very compact and novel construction, which can biasedly self-center a variety of differently sized and shapes objects, whilst aligning such an object to a variety of differently sized and shaped electronic device or cases retaining an electronic device.

Figure 15:
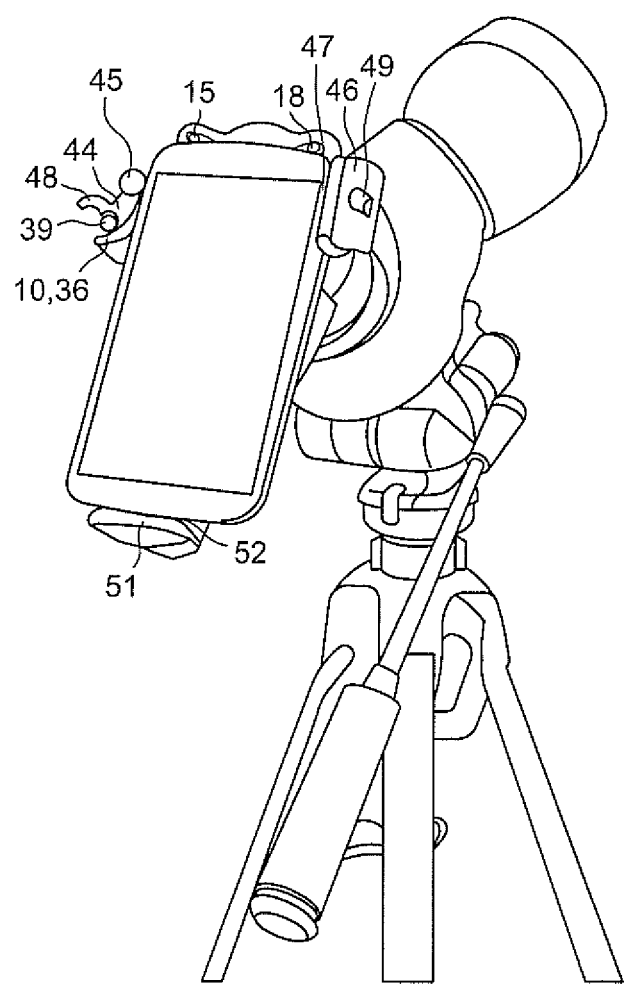
FIG. 15 is an isometric view of a first preferred embodiment of the self-centering adapter for an electronic device constructed in accordance with the present invention, depicted with a phone in the retained state and releasably engaged with the eyepiece of a spotting scope in a self-centering manner.
Figure 16:
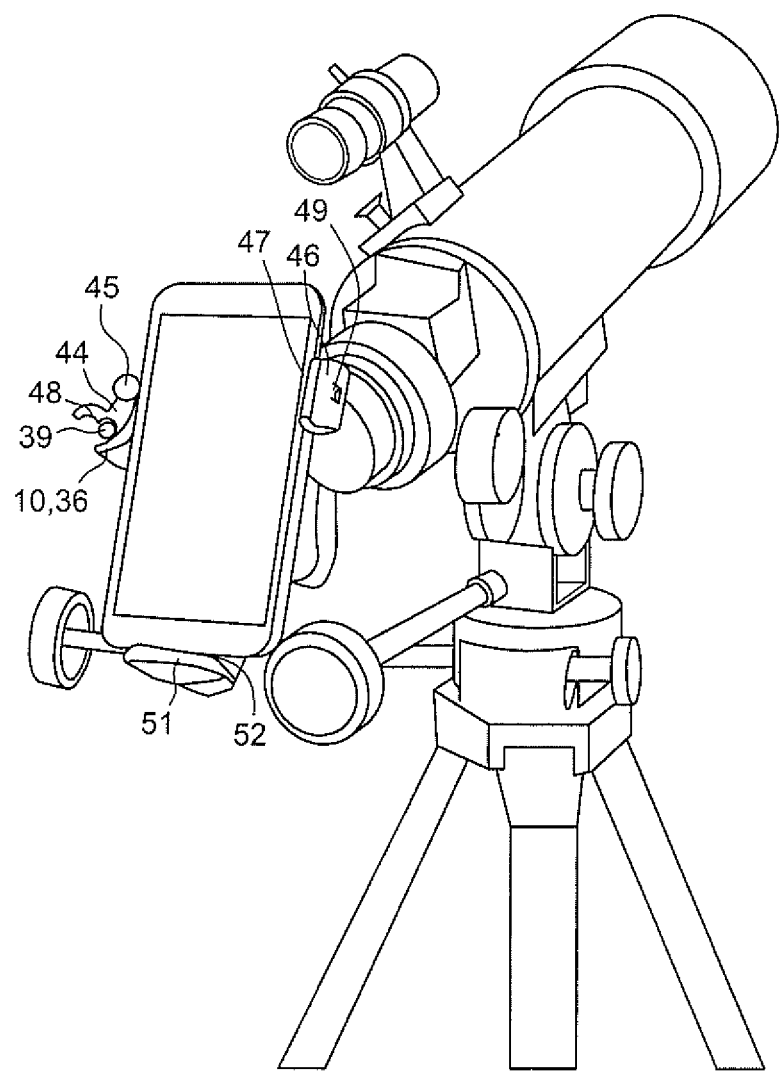
FIG. 16 is an isometric view of a first preferred embodiment of the self-centering adapter for an electronic device constructed in accordance with the present invention, depicted with a phone in the retained state and releasably engaged with the eyepiece of a telescope in a self-centering manner.
Figure 17A:
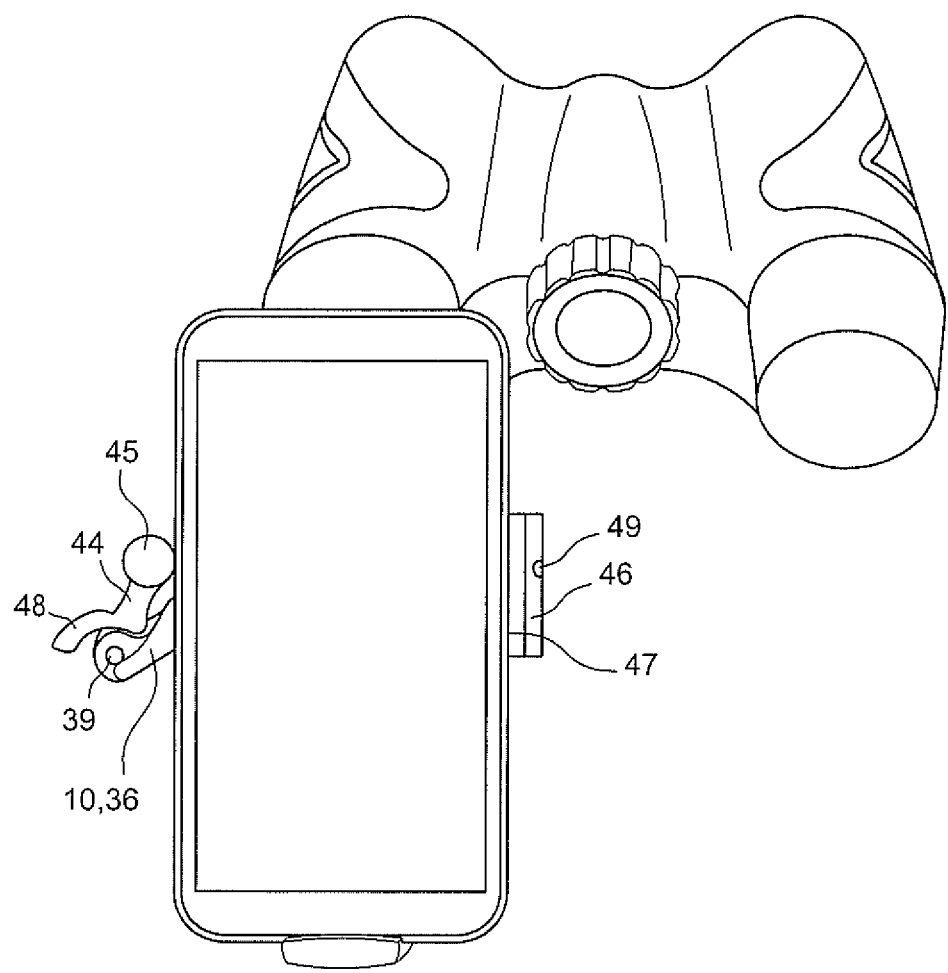
FIG. 17A is a front plane view of a first preferred embodiment of the self-centering adapter for an electronic device constructed in accordance with the present invention, depicted with a phone in the retained state and in the portrait orientation and releasably engaged with the eyepiece of a binocular in a self-centering manner.
Figure 17B:
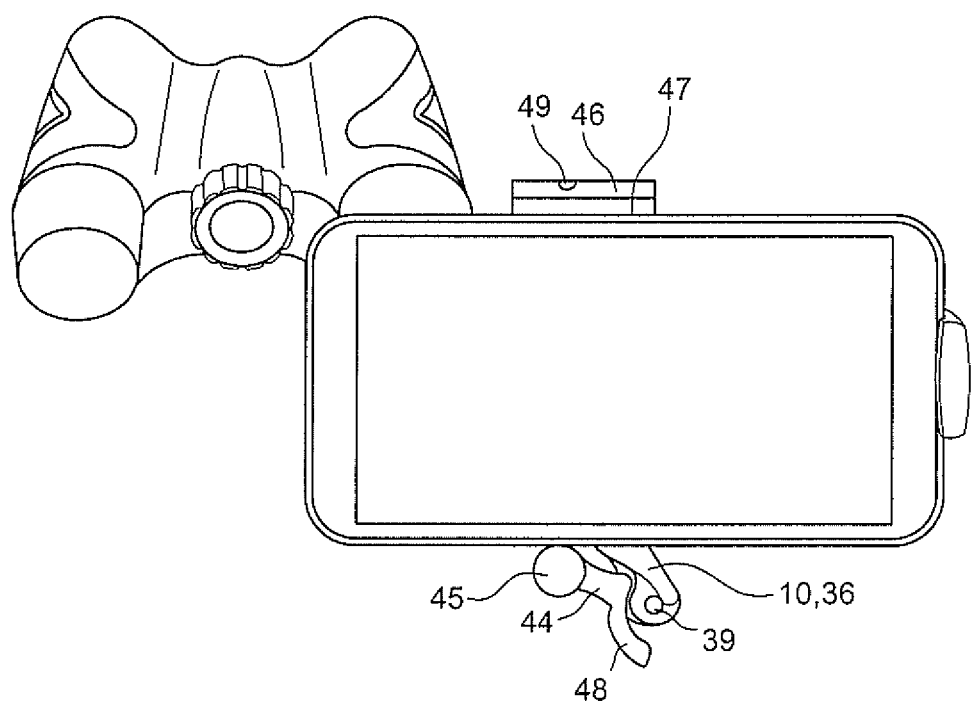
FIG. 17B is a front plane view of a first preferred embodiment of the self-centering adapter for an electronic device constructed in accordance with the present invention, depicted with a phone in the retained state and in the landscape orientation and releasably engaged with the eyepiece of a binocular in a self-centering manner.
Figure 18:
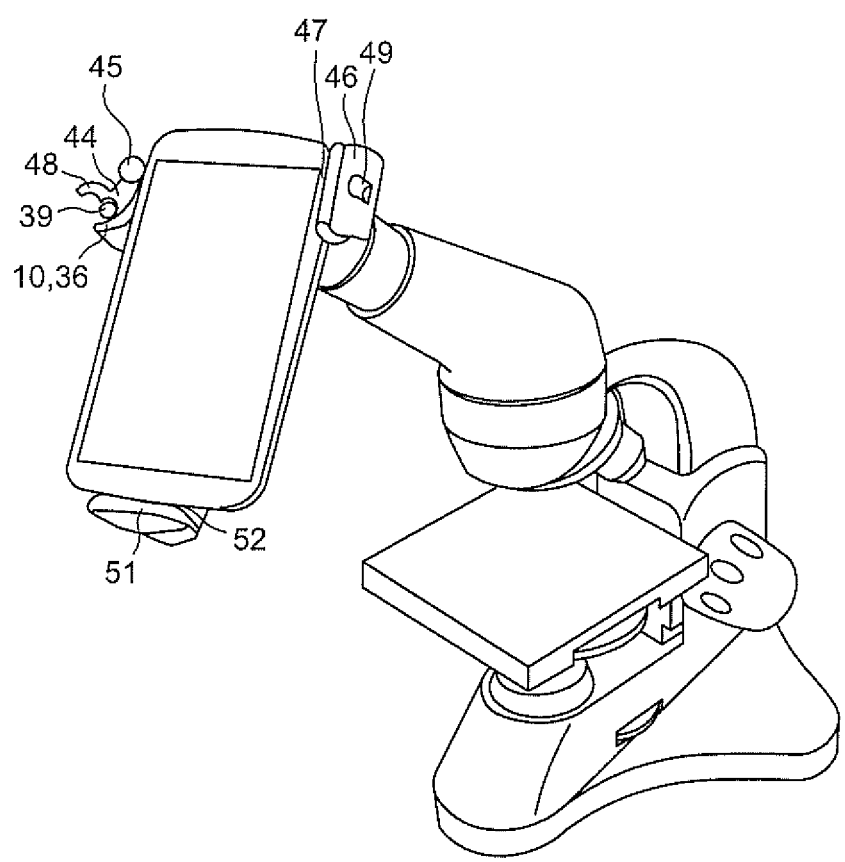
FIG. 18 is an isometric view of a first preferred embodiment of the self-centering adapter for an electronic device constructed in accordance with the present invention, depicted with a phone in the retained state and releasably engaged with the eyepiece of a microscope in a self-centering manner.

The adapter device can be used for several applications, but most notably as an optical adapter for electronic devices, such as but not limited to phones or tablets, specifically those having a camera or illumination means. In this application, the main body can include a cut-out or window such that light can pass between the electronic device and the optic. Due to the compact size of each individual device, and their inherent construction that allow for easy integration with other devices, the resulting adapter can be compact in size with a reduction in parts from the combined number of parts from each device. Such an adapter device for connecting an electronic device having a camera or illumination means to a range of optical devices, including but not limited to spotting scopes (FIG. 15), a monocular, binoculars (FIG. 17A/B), riflescopes, telescopes (FIG. 16), microscopes (FIG. 18), a slit-lamp microscope, night vision scopes, a lens, a magnifier, lens assemblies, telephoto lenses, loupes, scopes, fiber optics, endoscope, borescope, viewfinders, periscope, door scope, filters, beamsplitters, beam expanders, mirrors, kaleidoscope, prisms, polarizers or any outer housing for any of the aforementioned items. This adaptor device provides a self-centering and fitted connection between the electronic and optical device, so that the optical axes are aligned so that the user may take images or video on their electronic device through the optical device. In the pictorial examples FIG. 15-18, the self-centering mechanism is attached to the eyepiece or ocular end of the given device, and aligned to the camera of the electronic device. The user may place the adapter on the eyepiece or ocular end of the optical device in various orientations, as the self-centering mechanism will work in all orientations, as some may advantageous for photography and ease of use, such as portrait or landscape orientation as shown in FIG. 17A-17B respectively. In these optical applications, the user can use their electronic device as an economical viewfinder, to take or record pictures or video, or to view the image through the optical device remotely using another electronic device using available screen sharing applications. Also, there is no need to realign the device for different types of optics, so the user can take pictures through a microscope with a small eyepiece, then a spotting scope with a large eyepiece, etc. without adjustments needed.

While the invention has been particularly shown and described with respect to preferred embodiments thereof, it will be understood by those skilled in the art that changes in form and details may be made therein without departing from the scope and spirit of the invention.

What is claimed is:

1. A self-centering mechanism to retain an object having a center, wherein the self-centering mechanism comprises:
    a main body having an alignment axis and at least a first pivot axis, a second pivot axis, and a third pivot axis, such that at least the first pivot axis, the second pivot axis and the third pivot axis are rotationally asymmetric relative to the alignment axis, a first arm rotatable about the first pivot axis, and having at least a first end, a second arm rotatable about the second pivot axis, and having at least a first end, a third arm rotatable about the third pivot axis, and having at least a first end, wherein the geometry of at least the first arm, second arm and third arm, are such that at least the first end of each of at least the first, second, and third arm move in a self-centering manner about the alignment axis to retain and align an object.

2. The self-centering mechanism as claimed in claim 1, wherein at least each of the first arm, second arm and third arm, has at least one tangential member.

3. The self-centering mechanism as claimed in claim 2, wherein at least the first of the first arm tangential member and second arm tangential member are surfaces, and the surfaces move in a tangential manner due to the surfaces being in tangential contact with at least one other tangential member.

4. The self-centering mechanism as claimed in claim 3, wherein the self-centering mechanism further comprises a fourth arm, said fourth arm being mechanically connected to or part of at least the first of the second arm tangential member.

5. The self-centering mechanism as claimed in claim 3, wherein the surfaces are smooth curved surfaces.

6. The self-centering mechanism as claimed in claim 3, wherein the surfaces are gear surfaces.

7. The self-centering mechanism as claimed in claim 1, wherein the alignment axis is parallel to at least one of the first pivot axis, second pivot axis, or third pivot axis, and at least the first pivot, second axis and third axis are all mutually parallel.

8. The self-centering mechanism as claimed in claim 1, wherein at least the first end of the first arm and the first pivot axis are separated by a first distance, at least the first end of the second arm and the second pivot axis are separated by a second distance, at least the first pivot axis and the alignment axis are separated by a third distance, and at least the second pivot axis and the alignment axis are separated by a fourth distance, wherein at least the first distance, second distance, third distance and fourth distance are based upon a maximum size of the object that can be releasably retained and aligned by the self-centering mechanism.

9. The self-centering mechanism as claimed in claim 8, wherein the first and second arms are mechanically connected, such that upon release of both arms, at least the first end of each of at least the first, and second arms move towards the alignment axis in a self-centering manner.

10. The self-centering mechanism as claimed in claim 1, wherein the first and second arms each include at least a first lever, such that pressing at least the first lever of the first arm and the first lever of the second arm causes at least the first end of each of at least the first, and second arms to move away from the alignment axis in a self-centering manner.

11. The self-centering mechanism as claimed in claim 1, wherein the self-centering mechanism further comprises at least one bias member, and wherein the bias member preferentially rotates at least the first end of at least the first or second arm towards the fixed alignment axis.

12. The self-centering mechanism as claimed in claim 11, wherein at least one bias member provides the clamping force to retain the object.

13. The self-centering mechanism as claimed in claim 11, wherein the bias member is a torsional spring.

14. The self-centering mechanism as claimed in claim 1, wherein a movement of at least the first, second and third arm in a self-centering manner without an object retained may be offset geometrically to the alignment axis to account for the object having a weight of an anticipated range that may bias the self-centering mechanism due to gravity, such that the mechanism once retaining the object, having a weight within the anticipated range, is structured such that the center of the object is proximately aligned to the alignment axis.

15. The self-centering mechanism as claimed in claim 1, wherein the main body further comprises a fourth arm, wherein the fourth arm is rotatable about the third pivot axis or an additional fourth pivot axis.

16. The self-centering mechanism as claimed in claim 1, wherein the self-centering mechanism further comprises a fourth arm, and wherein the fourth arm is rotatable about the third pivot axis.

17. The self-centering mechanism as claimed in claim 16, wherein the third arm and fourth arm are connected via a centering mechanism, wherein the centering member retains the third and fourth arm, such that at least the respective first ends of the third and fourth arms move equidistantly from the alignment axis.

18. The self-centering mechanism as claimed in claim 1, wherein the object is an optical object or device having an optical axis, wherein the self-centering mechanism engages with the optical device in a self-centering manner with respect to the optical axis of the optical device.

19. The self-centering mechanism as claimed in claim 1, wherein the geometry that allows at least the first end of each of at least the first, second, and third arm move in a self-centering manner are surfaces.

20. A self-centering mechanism to align and retain an object having a central axis, wherein the self-centering mechanism comprises:
a main body having an alignment axis and at least a first pivot axis, a second pivot axis, and a third pivot axis, such that at least the first pivot axis, the second pivot axis and the third pivot axis are rotationally asymmetric relative to the alignment axis,
a first arm rotatable about the first pivot axis, and having at least a first end and at least one non-planar surface,
a second arm rotatable about the second pivot axis, and having at least a first end and at least one non-planar surface,
a third arm rotatable about the third pivot axis, and having at least a first end and at least one non-planar surface,
wherein at least the first non-planar surface of at least the first arm and second arm move tangentially to actuate the mechanism such that the object is retained to the main body with the central axis aligned to the alignment axis.

21. An optical adapter for retaining an optical device or optical object to at least one of an electronic device and an electronic device in a case having at least a first, second and third side and an optical axis, the optical adaptor having at least a self-centering mechanism that is releasably biased to retain the optical device or optical object in a self-centering manner, and a clamping portion for individually retaining at least one of the electronic device and the electronic device in a case, wherein a combination of the self-centering mechanism and clamping portion comprises:
a main body having an alignment axis, at least a first pivot axis, a second pivot axis and a third pivot axis, such that at least the first pivot axis, the second pivot axis and the third pivot axis are rotationally asymmetric relative to the alignment axis, and at least a first surface,
a first arm rotatable about the first pivot axis, and having at least one tangential member and at least one end,
a second arm rotatable about the second pivot axis, and having at least one tangential member and at least one end,
a first tangential member, such that the first tangential member moves in a tangential manner with the tangential member of the first arm,
a second tangential member, such that the second tangential member moves in a tangential manner with the tangential member of the second arm,
a third arm having at least one end, said third arm being mechanically connected to or a part of said first tangential member,
a first holder member being rotatable about the third pivot axis and having a first end,
a bias member preferentially rotating the first end of the first holder towards the alignment axis,
a second holder member having at least a first surface, such that when the electronic device is held in the retained state, the third side of the electronic device or the electronic device in a case is in at least partial contact with at least the first surface of the main body, the first end of the first holder member is in contact with at least the first side of the electronic device or the electronic device in a case, the first surface of the second holder portion is in contact with at least the second side of the electronic device or the electronic device in a case, and the electronic device or the electronic device in a case is retained due to the clamping force of the bias member that occurs between the first end of the first holder member and at least the first surface of the second holder member;
wherein the geometry of the tangential members of the first and second arm, and first and second tangential members, are selected such that the ends of at least the first, second and third arm releasably engage with an optical device in a self-centering manner, such that when the electronic device is held in the retained and aligned state so that the optical axis of the electronic device is aligned to the alignment axis of the main body, the electronic device can releasably engage with an optical device or object in a self-centering manner relative to the optical axis of the electronic device.

22. A self-centering method to retain an object, wherein the self-centering mechanism comprises: a main body having an alignment axis and at least a first pivot axis, a second pivot axis, and a third pivot axis, such that at least the first pivot axis, the second pivot axis and the third pivot axis are rotationally asymmetric relative to the alignment axis, a first arm rotatable about the first pivot axis, and having at least one surface and at least one end, a second arm rotatable about the second pivot axis, and having at least one surface and at least one end, a first member, a second member, a first tangential member, having at least one surface, said surface of the first tangential member being in tangential contact with the said surface of the first member, a second tangential member, having at least one surface, said surface of the second tangential member being in tangential contact with the said surface of the second member, a third arm having at least one end, said third arm being mechanically connected to or a part of said first tangential member, and at least one bias member, and wherein the bias member preferentially rotates at least one end of a member towards the central axis, wherein the shapes of the surfaces of the first and second arm, and first and second tangential members, are selected such that the ends of at least the first, second and third arm releasably engage with an object in a self-centering manner, wherein the method compromises the steps of:
pressing the first and second arms in conjunction, such that pressing both arms causes the ends of at least the first, second and third arms to move away from the alignment axis in a self-centering manner,
inserting the object into the self-centering mechanism,
releasing both the first and second arms, such that the ends of at least the first, second and third arms to move towards the alignment axis in a self-centering manner, and then releasably engage with the object in a self-centering manner.

23. A self-centering method to retain an object having a center, wherein the self-centering mechanism comprises: a main body having an alignment axis and at least a first pivot axis, a second pivot axis, and a third pivot axis, such that at least the first pivot axis, the second pivot axis and the third pivot axis are rotationally asymmetric relative to the alignment axis, wherein the fixed alignment axis is parallel to at least one of the first pivot, second pivot axis, or third pivot axis, and at least the first pivot, second axis and third axis are all mutually parallel, a first arm rotatable about the first pivot axis, and having at least one first arm tangential member and at least one end, a second arm rotatable about the second pivot axis, and having at least one second arm tangential member and at least one end, a third arm rotatable about the third pivot axis, and having at least one third arm tangential member and at least one end, wherein the geometry of at least the first of the first arm tangential member, second arm tangential member and third arm tangential member are such that at least the first end of each of at least the first, second, and third arm move in a self-centering manner about the fixed alignment axis to retain and align an object, wherein the method comprises the steps of:
pressing the first and second arms in conjunction, such that pressing both the first and second arms causes at least the first end of each of at least the first, second and third arms to rotate away from the alignment axis in a self-centering manner,
inserting the object into the self-centering mechanism, releasing both the first and second arms, such that at least the first end of each of at least the first, second and third arms to rotate towards the alignment axis in a self-centering manner, to releasably retain and align the object.

* * * * *